US012542051B2

(12) United States Patent
Wang et al.

(10) Patent No.: US 12,542,051 B2
(45) Date of Patent: Feb. 3, 2026

(54) SYSTEMS AND INTERFACES FOR LOCATION-BASED DEVICE CONTROL

(71) Applicant: Google LLC, Mountain View, CA (US)

(72) Inventors: Diane Wang, San Francisco, CA (US); Paulo Coelho, Milpitas, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 17/310,847

(22) PCT Filed: Nov. 20, 2019

(86) PCT No.: PCT/US2019/062440
§ 371 (c)(1),
(2) Date: Aug. 26, 2021

(87) PCT Pub. No.: WO2020/222871
PCT Pub. Date: Nov. 5, 2020

(65) Prior Publication Data
US 2022/0057922 A1 Feb. 24, 2022

Related U.S. Application Data

(60) Provisional application No. 62/840,877, filed on Apr. 30, 2019.

(51) Int. Cl.
G08C 17/02 (2006.01)
G06F 3/01 (2006.01)
(Continued)

(52) U.S. Cl.
CPC ............ G08C 17/02 (2013.01); G06F 3/017 (2013.01); G06F 3/0346 (2013.01);
(Continued)

(58) Field of Classification Search
CPC .... G06F 3/04847; G06F 3/017; G06F 3/0346; G06F 3/04817; G06F 1/1626;
(Continued)

(56) References Cited

U.S. PATENT DOCUMENTS 8,230,075 B1 * 7/2012 Weskamp ............. H04W 4/023
715/740
9,084,013 B1 7/2015 Arini et al.
(Continued)

FOREIGN PATENT DOCUMENTS

EP 2996359 A1 3/2016
WO 2016192916 A1 12/2016
(Continued)

OTHER PUBLICATIONS

International Search Report and Written Opinion for International Application No. PCT/US2019/062440, mailed Mar. 11, 2020, 16 pages.
(Continued)

Primary Examiner — Irete F Ehichioya
Assistant Examiner — Phoebe X Pan
(74) Attorney, Agent, or Firm — Brake Hughes Bellermann LLP

(57) ABSTRACT

Systems and methods for location-based device control are provided. Example systems and methods include determining a location estimate for a computing device and identifying a controllable device based on the location estimate. Some examples also include determining a relative location of the controllable device with respect to the computing device and triggering display, on the computing device, of a user interface for interacting with the controllable device based on the relative location. Another example system and method includes identifying a controllable device within a physical space based on an aiming direction in which a
(Continued)

computing device is aimed, determining an angular offset of the controllable device with respect to the aiming direction of the computing device, and triggering display, on the computing device, of a user interface that indicates the determined angular offset.

28 Claims, 28 Drawing Sheets

(51) Int. Cl.
| | |
|---|---|
| *G06F 3/0346* | (2013.01) |
| *G06F 3/04817* | (2022.01) |
| *G06F 3/04847* | (2022.01) |
| *G06T 19/00* | (2011.01) |
| *H04M 1/72415* | (2021.01) |
| *H04N 21/41* | (2011.01) |

(52) U.S. Cl.
CPC ...... *G06F 3/04817* (2013.01); *G06F 3/04847* (2013.01); *G06T 19/006* (2013.01); *H04M 1/72415* (2021.01); *H04N 21/41265* (2020.08); *H04N 21/4131* (2013.01); *G06T 2200/24* (2013.01); *G08C 2201/91* (2013.01)

(58) Field of Classification Search
CPC ...... G06F 1/163; G06F 1/1688; G06F 1/1694; G06F 3/012; G06F 3/013; G06F 1/1686; G06T 19/006; G06T 2200/24; H04L 12/282; G08C 2201/91; G08C 17/02; H04M 1/72415; H04N 21/41265; H04N 21/4131; H04N 21/4222; H04N 21/43615; H04N 21/44227; H04N 21/4223; H04N 21/4524; H04N 21/472
See application file for complete search history.

(56) References Cited

U.S. PATENT DOCUMENTS

| | | | |
|---|---|---|---|
| 9,462,423 B1 | 10/2016 | Rivlin et al. | |
| 9,477,302 B2 | 10/2016 | Kauffmann et al. | |
| 9,923,974 B2* | 3/2018 | Weskamp | H04L 67/141 |
| 9,939,853 B2* | 4/2018 | Lim | G06F 3/0486 |
| 10,019,894 B2* | 7/2018 | Agardh | G08C 17/02 |
| 10,701,661 B1 | 6/2020 | Coelho et al. | |
| 11,082,249 B2 | 8/2021 | Wang et al. | |
| 2001/0041007 A1 | 11/2001 | Aoki | |
| 2004/0121725 A1 | 6/2004 | Matsui | |
| 2007/0252721 A1* | 11/2007 | Geurts | G06F 3/0325 340/4.31 |
| 2011/0031897 A1 | 2/2011 | Henig et al. | |
| 2012/0088526 A1* | 4/2012 | Lindner | H04W 64/00 455/457 |
| 2012/0127012 A1* | 5/2012 | Gicklhorn | H04M 1/72415 340/5.1 |
| 2012/0169482 A1* | 7/2012 | Chen | G08C 17/02 340/12.52 |
| 2013/0230214 A1* | 9/2013 | Arth | G06T 7/74 382/107 |
| 2014/0043433 A1 | 2/2014 | Scavezze et al. | |
| 2014/0111380 A1 | 4/2014 | Gibbs et al. | |
| 2014/0123043 A1* | 5/2014 | Schmidt | G06F 3/04883 715/769 |
| 2014/0247280 A1* | 9/2014 | Nicholas | G06T 19/006 345/633 |
| 2014/0249657 A1 | 9/2014 | Yurasits et al. | |
| 2014/0253386 A1 | 9/2014 | Sun et al. | |
| 2015/0052231 A1 | 2/2015 | Sun et al. | |
| 2015/0070319 A1 | 3/2015 | Pryor | |
| 2015/0109407 A1* | 4/2015 | Giger | G01S 17/86 348/36 |
| 2015/0153181 A1 | 6/2015 | Gildfind et al. | |
| 2015/0254983 A1* | 9/2015 | Mochizuki | G08G 1/165 340/435 |
| 2015/0256972 A1 | 9/2015 | Markhovsky et al. | |
| 2015/0350946 A1 | 12/2015 | Das et al. | |
| 2015/0351204 A1* | 12/2015 | Hershberg | H04L 67/75 315/153 |
| 2015/0365248 A1* | 12/2015 | Zhang | H04L 12/282 715/738 |
| 2016/0117076 A1 | 4/2016 | Kim et al. | |
| 2016/0191775 A1* | 6/2016 | Naguib | G01S 5/02522 348/207.11 |
| 2016/0239096 A1* | 8/2016 | Okuno | H04N 21/42222 |
| 2016/0252967 A1 | 9/2016 | Liang et al. | |
| 2016/0269904 A1* | 9/2016 | Sharma | H04W 4/20 |
| 2016/0283205 A1 | 9/2016 | Chen et al. | |
| 2016/0320934 A1 | 11/2016 | Thomason | |
| 2016/0337797 A1 | 11/2016 | Choi et al. | |
| 2016/0358459 A1* | 12/2016 | Singhar | H04W 4/023 |
| 2016/0375831 A1 | 12/2016 | Wang et al. | |
| 2017/0013112 A1* | 1/2017 | Singhar | G08C 23/04 |
| 2017/0162036 A1 | 6/2017 | Agardh et al. | |
| 2017/0255286 A1* | 9/2017 | Jayaraj | G06F 3/013 |
| 2018/0143432 A1 | 5/2018 | Li et al. | |
| 2018/0143756 A1 | 5/2018 | Mildrew et al. | |
| 2018/0151060 A1 | 5/2018 | Griffin | |
| 2018/0275762 A1 | 9/2018 | Freeman et al. | |
| 2018/0310274 A1 | 10/2018 | Fan et al. | |
| 2018/0322774 A1 | 11/2018 | Wang et al. | |
| 2018/0336396 A1 | 11/2018 | Harrison | |
| 2019/0122538 A1 | 4/2019 | Marks et al. | |
| 2019/0235641 A1 | 8/2019 | Goldberg et al. | |
| 2019/0302714 A1* | 10/2019 | Laurent | H04L 12/282 |
| 2020/0326837 A1* | 10/2020 | Ni | G06F 3/04883 |
| 2021/0397840 A1* | 12/2021 | Van De Sluis | H05B 47/125 |
| 2022/0035498 A1* | 2/2022 | Kim | H04L 12/28 |

FOREIGN PATENT DOCUMENTS

| | | |
|---|---|---|
| WO | 2017201162 A1 | 11/2017 |
| WO | 2018005061 A1 | 1/2018 |

OTHER PUBLICATIONS

International Search Report and Written Opinion for International Application No. PCT/US2019/014937, mailed Jun. 21, 2019, 14 pages.
Communication pursuant to Article 94(3) EPC for European Application No. 19817556.4, mailed Mar. 6, 2023, 6 pages.
Summons to Attend Oral Proceedings for European Application No. 19817556.4, mailed Oct. 26, 2023, 10 pages.
Braun, et al., "Passive Identification and Control of Arbitrary Devices in Smart Environments", J.A. Jacko (Ed.): Human-Computer Interaction, Part III, HCII 2011, LNCS 6763, pp. 147-154.

* cited by examiner

SYSTEMS AND INTERFACES FOR LOCATION-BASED DEVICE CONTROL

CROSS-REFERENCE TO RELATED APPLICATIONS

This application is a 35 U.S.C. § 371 National Phase Entry Application from PCT/US2019/062440, filed on Nov. 20, 2019, entitled "SYSTEMS AND INTERFACES FOR LOCATION-BASED DEVICE CONTROL", which claims the benefit of U.S. Provisional Application No. 62/840,877, filed on Apr. 30, 2019, entitled "SYSTEMS AND INTERFACES FOR LOCATION-BASED DEVICE CONTROL," the disclosures of which are incorporated herein by reference in their entirety.

This application is related to U.S. application Ser. No. 16/372,559, filed on Apr. 2, 2019, entitled "LOCATION DETERMINATION FOR DEVICE CONTROL AND CONFIGURATION", now U.S. Pat. No. 11,082,249, and U.S. application Ser. No. 16/372,674, filed on Apr. 2, 2019, entitled "LOCATION DETERMINATION FOR DEVICE CONTROL AND CONFIGURATION", now U.S. Pat. No. 10,701,661, the disclosures of which are incorporated herein by reference in their entirety.

BACKGROUND

Buildings, such as homes and offices, often include many devices that can be accessed and/or controlled remotely. For example, a light may allow a user to toggle it or adjust its parameters (e.g., brightness, color) via a computing device such as a smartphone. In some examples, the devices can be controlled via various types of wireless communication. For instance, some devices are controlled via instructions transmitted over WiFi or Bluetooth. Some devices may also be controlled via infrared signals.

SUMMARY

This disclosure describes systems and methods for position-based location determination for device control and configuration. For example, systems and techniques described herein may be used to generate a user interface for interacting with a controllable device based on the location of a computing device.

One aspect is a method comprising: determining a location estimate for a computing device; identifying a controllable device based on the location estimate; determining a relative location of the controllable device with respect to the computing device; and triggering display, on the computing device, of a user interface for interacting with the controllable device based on the relative location.

Another aspect is a method comprising: determining a location estimate for a computing device; identifying a plurality of controllable devices based on the location estimate; determining relative locations of the controllable devices with respect to the computing device; and triggering display, on the computing device, of a user interface that includes a spatial representation of the plurality of controllable devices based on the relative locations of the controllable devices.

Yet another aspect is a method comprising: identifying a controllable device within a physical space based on an aiming direction in which a computing device is aimed; determining an angular offset of the controllable device with respect to the aiming direction of the computing device; and triggering display, on the computing device, of a user interface that indicates the determined angular offset.

The details of one or more implementations are set forth in the accompanying drawings and the description below. Other features will be apparent from the description and drawings, and from the claims.

DETAILED DESCRIPTION

Figure 1:
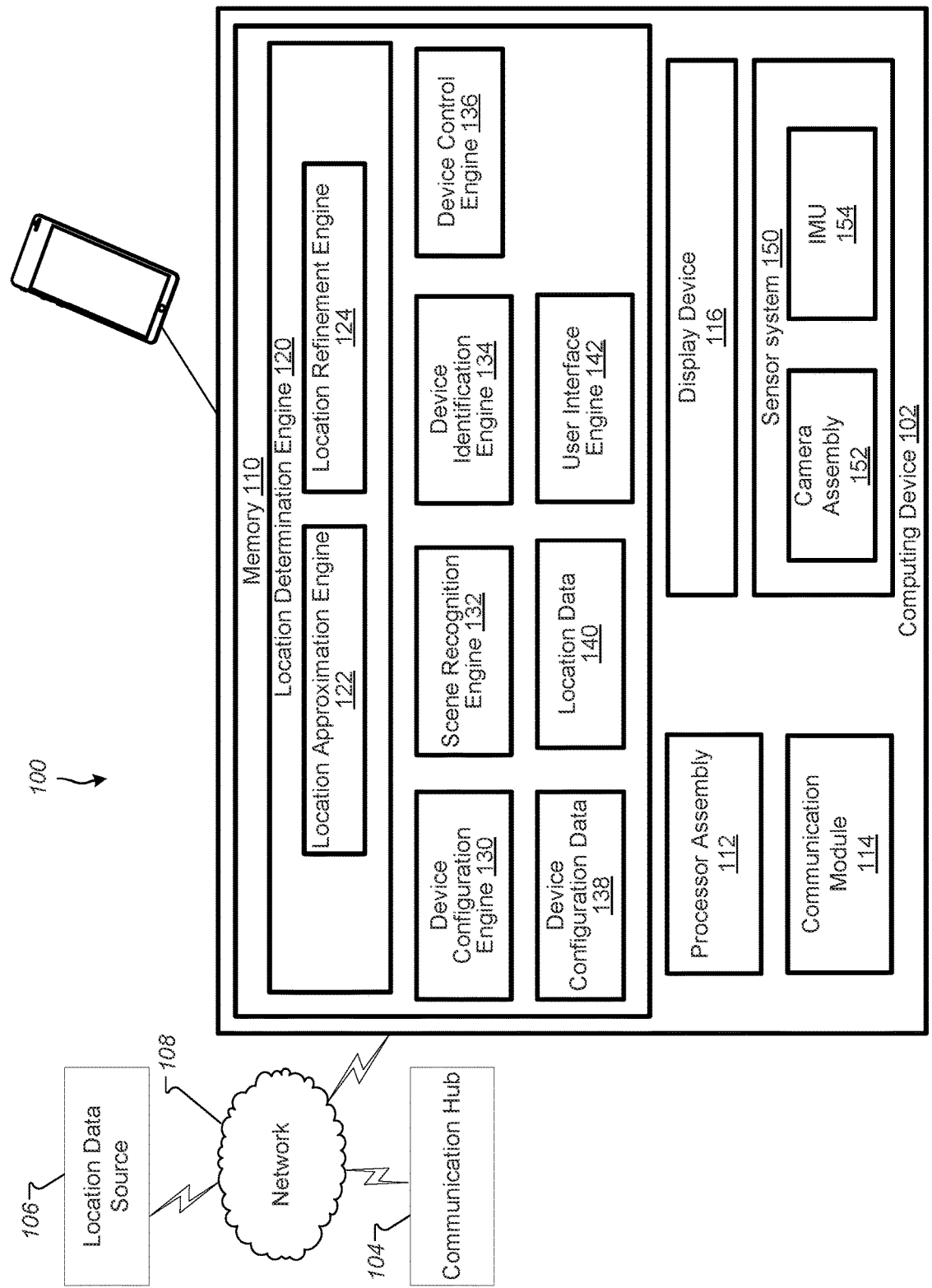
FIG. 1 is a block diagram illustrating a system according to an example implementation.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

The number of devices that can be controlled remotely within a building has been increasing rapidly. Some examples of controllable devices include lights, switches, outlets, thermostats, badge readers, fire or other environmental alarms, blinds, entertainment devices such as televisions, stereos, media player, and computing equipment such as wireless network access points, printers, scanners, and copiers. In some situations, a building may have multiple of the same type of controllable device. For example, an office building could have hundreds or thousands of identical or nearly identical controllable light bulbs. Personal spaces, such as homes, may also have many controllable devices of various types.

A user may wish to access, control, or otherwise communicate with a target controllable device using, for example, a smartphone. But, in these situations, it may be difficult for the user to identify the target device among the many available. Additionally, it may be challenging for a user to initially configure the controllable devices and associate them with locations in an interior space. These difficulties may be compounded when traditional methods of determining a location for the computing device are used, which often perform poorly within an interior space.

Users often desire a simple process to setup or configure these controllable devices within a physical space. However, setting configuring a newly added controllable device often requires determining a location within the physical space and understanding the layout of the physical space. For example, there are many technical problems with determining location within an interior physical space where global positioning system (GPS) signals may not be available, accurate, or reliable. Visual positioning systems, which attempt to determine a location based on comparing images captured with a camera to a known set of features or images of a space, can be used when GPS is not available. But visual positioning systems may require access to a detailed map of the interior space and may use large amounts of data, processing cycles, time, and power. Furthermore, even if the location can be determined, it may be difficult to identify and provide a meaningful name for a newly added controllable device without understanding the context within which the controllable device has been placed. Conventional processes for configuring a newly added controllable device to an interior space typically cannot determine what type of space the device has been added to or where the device has been added within the space. Additionally, conventional processes for configuring newly added controllable device are unable to determine when controllable devices should be grouped for control purposes (e.g., so that a single command can activate, affect, or deactivate a several light bulbs that are plugged into a single fixture). Thus, there are many technical problems with understanding the context of interior spaces in order to provide meaningful descriptive information for controllable devices.

The present disclosure describes technical improvements in determining a location within an interior space. These improvements may allow for a mobile computing device, such as a smartphone, to determine a location within an interior space using less data, processing cycles, or power than would be required using existing techniques. Furthermore, the present disclosure describes technical improvements to current processes of configuring newly added controllable devices to a physical space, including identifying newly added controllable devices, determining layout information about the physical space, and generating descriptive information about the newly added controllable devices.

In some implementations, the user aims at the controllable device by aiming a computing device at the controllable device. For example, aiming the computing device at the controllable device may include orienting the computing device in a specific way with respect to the controllable device (or target location). In some implementations, the user aims at the controllable device by physically targeting (e.g., aiming, pointing, orientating) at least a portion of a mobile computing device (e.g., a smartphone or tablet) at the controllable device. For example, a user may aim at a controllable device by physically pointing the top of a computing device at the controllable device (e.g., like the computing device was a remote control). In some implementations, the user aims at a controllable device by physically aiming a camera lens of a mobile computing device, which may be located on a back panel of the computing device, at the controllable device. Aiming the computing device at the controllable device may include aiming the computing device at the controllable device without emitting a signal directed to the controllable device (i.e., the computing device does not emit an IR signal or laser signal).

When the user is aiming at the controllable device, the mobile computing device determines a coordinate corresponding to the location and a direction. For example, the location may be determined using a visual positioning module of the mobile computing device and the direction may be determined based on an orientation of the mobile computing device as determined using the visual positioning module or as measured using, for example, an inertial motion unit. Some implementations include a head-mounted display device and the user may aim at the device by looking at the controllable device. Some implementations may also include a hand-tracking module, and the user may aim at the controllable device by gesturing (e.g., pointing) at the controllable device. The computing device may then store (e.g., locally or on a remote server) information associated with the controllable device, including the determined coordinates. In some implementations, the computing device may also establish an intersection volume associated with the controllable device. The size and shape of the intersection volume may be based on properties of the controllable device determined based on a type of the controllable device. In some implementations, the size and shape of the intersection volume may be determined based on how much of the field of view of the camera the controllable device occupies. When the target coordinates are determined, the computing device may determine (or suggest) some additional information about the controllable device, such as a name, a room assignment, and setting access/permissions for controlling the device.

Although many of the examples described herein use a visual positioning system to determine a location and orientation of the computing device, other implementations may use other types of location and orientation technologies. Implementations are possible using other types of 6 degree of freedom (6-dof) localization systems that provide 6-dof poses of a computing device.

Later, a user may aim at a controllable device that has previously been added to the three-dimensional representation of the physical space to call up an interface to control the device. For example, a computing device may generate a ray based on a location and direction determined while the user is aiming at the controllable device. The computing device may then evaluate the ray against the coordinates and/or intersection volumes associated with controllable devices in the three-dimensional representation of the physical space. If the ray intersects one of the intersection volumes or passes near the coordinates, the interface controlling the associated controllable device may be displayed. If the ray is directed toward multiple controllable devices, a selection interface may be displayed to allow the user to select the desired target device. The controllable devices may be listed on the selection interface in an order determined based on distance from the user.

Although many of the examples described herein relate to orienting a smartphone toward a controllable device and controlling the device using a user interface displayed by the smartphone, alternatives are possible. For instance, some implementations include an augmented reality (AR) system in which a user wears a head-mounted display that can overlay content on the user's field of view. In these implementations, the user may aim at a controllable device using a hand gesture, a head orientation, or even a gaze. The user interface to control an identified device may then be overlaid on the user's field of view.

FIG. 1 is a block diagram illustrating a system 100 for location determination for device control and configuration according to an example implementation. In some implementations, the system 100 includes a computing device 102, a communication hub 104, and a location data source 106. Also shown is a network 108 over which the computing device 102 may communicate with the communication hub 104 and the location data source 106. The computing device 102 may communicate with at least some controllable devices via the communication hub 104. The computing device 102 may also communicate directly with at least some controllable devices.

The communication hub 104 is a network-connected device that is configured to wirelessly communicate with controllable devices. In some implementations, the communication hub 104 may also be configured to communicate with the computing device 102. The communication hub 104 may use a first communication protocol to communicate with the computing device 102, such as WiFi or BlueTooth. The communication hub 104 may use a second communication protocol to communicate with the controllable devices. In some implementations, the communication hub 104 may issue commands in a specific form required by the controllable devices in response to instructions received from the computing device 102.

The computing device 102 may include a memory 110, a processor assembly 112, a communication module 114, a display device 116, and a sensor system 150. The memory 110 may include a location determination engine 120, a device configuration engine 130, a scene recognition engine 132, a device identification engine 134, a device control engine 136, device configuration data 138, location data 140, and a user interface engine 142. In some implementations, the computing device 102 is a mobile computing device (e.g., a smartphone).

The sensor system 150 may include various sensors, such as a camera assembly 152. Implementations of the sensor system 150 may also include other sensors, including, for example, an inertial motion unit (IMU) 154, a light sensor, an audio sensor, an image sensor, a distance and/or proximity sensor, a contact sensor such as a capacitive sensor, a timer, and/or other sensors and/or different combination(s) of sensors. In some implementations, the location determination engine 120 may use the communication module 114 and the sensor system 150 to determine a location and orientation of the computing device 102 within a physical space and/or to recognize features or objects within the physical space.

The camera assembly 152 captures image data, such as images and/or videos of the physical space around the computing device 102. The camera assembly 152 may include one or more cameras, which may be disposed at any position on the computing device 102. The camera assembly 152 may also include an infrared camera. Images or image data captured with the camera assembly 152 may be used to determine a location and orientation of the computing device 102 within a physical space, such as an interior space, based on a representation of that physical space that is received from the memory 110 or an external computing device such as the location data source 106. In some implementations, the representation of a physical space may include visual features of the physical space (e.g., features extracted from previously captured images of the physical space). The representation may also include location-determination data associated with those features that can be used by a visual positioning system to determine a location and/or position within the physical space based on one or more images of the physical space. The representation may also include a three-dimensional model of at least some structures within the physical space. In some implementations, the representation does not include three-dimensional models of the physical space.

The location determination engine 120 may be configured to perform one or multiple interior location estimating techniques. An interior location estimating technique may include a technique for determining a location of a mobile computing device within an interior space, such as inside a home or building. At least some of the interior location estimating techniques may also be capable of estimating locations in exterior spaces too. The interior location estimating techniques may each be associated with different error bounds. Additionally, the techniques may require access to different resources of the computing device 102 or may use different amounts of processing cycles, memory, or time to estimate a location of the computing device 102.

An error bounds may include a numeric value corresponding to the accuracy or precision of the interior location estimating technique. The error in an estimate may be determined based on the difference between the actual location of a mobile computing device and the estimated location of the mobile computing device. The smaller the error, the closer the estimate is to the actual location of the mobile computing device. The error bounds may characterize the expected error from a location estimating technique. For example, the numeric value may represent a maximum error of the estimating technique. The numeric value may also represent a probabilistic error range for the estimating technique. For example, the numeric value may represent an error distance such that a pre-defined portion (such as 90% or 95%) of estimates have error values less than the error distance (i.e., the pre-defined portion of estimates are more accurate than the error distance). The error bounds may also include a numeric value corresponding to a statistical or probabilistic value that characterizes the error of a location estimating technique, such as a standard deviation or variance.

In some implementations, the location determination engine 120 may include a location approximation engine 122 and a location refinement engine 124. The location approximation engine 122 may estimate a location of the computing device 102 using a first location estimating technique, and the location refinement engine 124 may estimate a location of the computing device 102 using a second location estimating technique. For example, the first location estimating technique may have a larger error bound than the second location estimating technique (i.e., the first location estimating technique may be less accurate or less precise than the second location estimating technique).

In some implementations, the location approximation engine 122 implements a wireless signal based location estimating technique. The location approximation engine 122 may estimate a location of the mobile computing device based on wireless signals received by the mobile computing device, such as wireless signals generated by one or more wireless communication devices. Examples of wireless communication devices include as wireless network access points, routers, switches, and other controllable devices. In some implementations, the wireless communication devices are stationary devices that do not move on their own and are not intended to be regularly moved. The wireless communication devices may be devices that, for example, have a physical connection to an external power source (e.g., are plugged into a wall socket, or another device or fixture that is plugged into a wall socket).

For example, the location approximation engine 122 may estimate a distance between the computing device 102 and one or more wireless communication devices. The distance estimates may be based on a round-trip time for communication with a wireless communication device. For example, the distance estimates may be based on Wi-Fi Round-trip-Time (also referred to as round-trip delay time), which may be supported by devices that implement the IEEE 802.11mc standard. In some implementations, a duration of time is measured between when a signal is sent from the computing device 102 to a wireless communication device and when an acknowledgment signal from that wireless communication device is received back at the computing device 102. The duration of time may then be converted to an approximate distance the signals traveled based on propagation rate of the signals through air. In some implementations, the duration of time may be adjusted based on an actual or expected delay in responding to the signal (e.g., computational delays to process the received signal or generate the acknowledgment signal). The distance between the computing device 102 and the wireless communication device may then be determined as half of the distance the signal travelled.

The location approximation engine 122 may use distance estimates from multiple wireless communication devices to estimate a location of the mobile computing device. For example, some implementations use distance estimates from three or more wireless communication devices. In some implementations, previously established locations of the wireless communication devices (e.g., locations with respect to a representation of the physical space) may be used to determine a location of the mobile computing device using triangulation. The previously established locations may correspond to absolute locations with respect to a coordinate system representing a physical space.

The previously established locations may also be relative locations with respect to other wireless communication devices, including controllable devices. The previously established locations may also be relative to previous locations of the computing device 102 or environmental features previously detected by or objects previously recognized by the computing device 102 (e.g., based on image data captured with the computing device 102).

Based on the relative location data, the location approximation engine 122 may determine a location of the computing device 102 with respect to one or more of a previous location of the computing device 102, a location of a wireless communication device, a location of a controllable device, a location of an object that has been previously recognized by the computing device 102, or a location of features previously captured by the computing device 102.

The locations estimate generated by the location approximation engine 122 may be accurate to within one or two meters. In some implementations, the error bounds for the location estimate from the location approximation engine 122 may be one meter, two meters, or another distance. In some implementations, the location approximation engine 122 may determine which room within a physical space the computing device 102 is located. In some implementations, the location estimate generated by the location approximation engine 122 includes a location only but does not include orientation information (i.e., the location approximation engine 122 does not generate an estimate of 6-dof pose for the computing device 102).

In some implementations, the location refinement engine 124 may include a visual positioning system that implements a location estimating technique by comparing images or image data captured by the camera assembly 152 (or features extracted from or objects recognized in those images) to a known arrangement of features within the representation of the physical space to determine a six-degree-of-freedom (6DOF) pose (e.g., a location and orientation) of the computing device 102 within the physical space.

In some implementations, the location refinement engine 124 may start with or otherwise use a location estimate determined by the location approximation engine 122 to estimate a location of the mobile computing device. For example, the location refinement engine 124 may retrieve a portion of a representation of a physical space corresponding to the location estimate from the location approximation engine 122. The portion of the representation of the physical space may correspond to a room (such as a living room, an office, a kitchen, a bedroom, etc.) in which the location estimate from the location approximation engine 122 indicates the computing device 102 is located.

The location refinement engine 124 may then compare features extracted from image data captured by the camera assembly 152 with features in the portion of the representation of the physical space to determine a location of the mobile computing device within the portion of the representation of the physical space. The location may be determined, for example, by identifying where in the portion of representation of the physical space features most similar to extracted features exist. The location refinement engine 124 may then identify a transformation that can map the extracted features to the features identified within the representation. Based on the transformation, the location refinement engine 124 may determine a location and orientation of a lens of the camera assembly 152 (and therefore of the computing device 102) with respect to the features of the identified within the portion of the representation of the physical space. Beneficially, because the location refinement engine 124 is comparing the extracted features to features in only a portion of the representation of the physical space rather than the entire physical representation, the comparison may be performed more quickly, using less data and time and fewer processing cycles.

In some implementations, the location refinement engine 124 uses a machine learning model to generate a location estimate for the computing device 102. For example, the machine learning model may include a neural network. Although many of the examples herein refer to a neural network, it should be understood that other types of machine learning models may also be applied to generate location estimates. The input layer of the neural network may receive various types of input data. In some implementations, the input data for the neural network includes one or more of location estimates from the location approximation engine 122 and estimated distances from wireless communication devices determined by the location approximation engine 122. In some implementations, the input data may also include one or more of image data captured by the camera assembly 152, features extracted from the image data, or objects recognized within the image data. The input data may also include other signals such as orientation or acceleration data generated by the IMU 154. The input data may also include the relative locations of a virtual anchor (sometimes referred to as a cloud anchor) or other recognized entity within the physical space. A virtual anchor may be a previously identified location within the physical space that can be recognized based on features extracted from the image data. The virtual anchor may, for example, correspond to a location in a representation of the physical space and may allow for mapping the representation to the physical space.

The machine learning model may apply various weights to these inputs and combine the weighted inputs to generate a location estimate. In some implementations, the machine learning model includes a neural network model that has multiple network layers. Each layer may include an array of values that are calculated as a weighted combination of some or all of the values on the previous layer. The weights may be determined using a training process that uses a corpus of training data. The training data may include training input data that is labeled with the expected output data (i.e., location data). During the training process, the weights are iteratively adjusted based on the differences between the actual output data from the network and the expected output data. As the weights are adjusted through successive rounds of training, the output data from the neural network may become closer to the expected output data for the training data. Thereafter, the neural network can use the weights learned during training to predict location data from input data that was not part of the training input data.

In some implementations, the location estimate provided by the location refinement engine 124 may be more accurate than the location estimate provided by the location approximation engine 122. For example, the error bounds of the location estimate provided by the location refinement engine 124 may be smaller than the error bounds of the location estimate provided by the location refinement engine 124. In some implementations, the error bounds for the location estimate from the location refinement engine 124 may be one millimeter, two millimeters, five millimeters, one centimeter, two centimeters, five centimeters, ten centimeters, twenty centimeters, fifty centimeters, one meter, two meters, or another distance. In some implementations, the location estimate generated by the location refinement engine 124 includes a 6DOF pose for the computing device 102 (i.e., the location estimate includes both a location and an orientation of the computing device 102).

The device configuration engine 130 configures controllable devices. For example, the device configuration engine 130 may determine a location of and descriptive information about an unconfigured controllable device, such as a controllable device that was recently added to a physical space. Configuring a controllable device may include storing the location and information about the controllable device in a data store.

The location may be a location with respect to a representation of the physical space. The descriptive information may include a descriptive name for the controllable device and a room in which the controllable device is located. In some implementations, the device configuration engine 130 may also group controllable devices together so that they may be commonly controlled (e.g., controlled with a single command). Controllable devices may be grouped based on one or more of proximity to each other, type, and association with a common fixture. For example, multiple controllable light bulbs that are mounted in a single fixture may be grouped together so that the controllable light bulbs can be activated, deactivated, dimmed, or otherwise altered (e.g., color adjustments) in unison.

In some implementations, the device configuration engine 130 determines a location of a controllable device based on determining a location of the computing device 102 with the location determination engine 120 and determining a relative location of the controllable device with respect to the computing device 102 based on image data. For example, the location of the controllable device may be determined when the computing device 102 is oriented such that the controllable device is within a field of view of the camera assembly 152.

In some implementations, the process of configuring a controllable device is initiated when a user activates a configuration mode on the computing device 102 and actuates a physical control (e.g., by pressing a button) on the communication hub 104. In some implementations, the configuration mode can be activated using a user interface generated by, for example, the user interface engine 142 of the computing device 102. In some implementations, the process of configuring a controllable device is initiated by capturing an image of a barcode, sticker, or QR code on the controllable device, the packaging of the controllable device, or materials accompanying the controllable device. In some implementations, the computing device 102 or the communication hub 104 may then cause the unconfigured controllable device to strobe on or off intermittently (e.g., by transmitting a command to the controllable device). The computing device 102 or the communication hub 104 may instruct the unconfigured controllable device to display a specific image such as a barcode or QR code. The device configuration engine 130 may identify the controllable device within the field of view of the camera assembly 152 based on the strobing or based on identifying the image that is being displayed.

In some implementations, multiple unconfigured controllable devices may be recognized within the field of view of the camera assembly 152. When multiple unconfigured controllable devices are detected by the communication hub 104, the communication hub 104 may cause the controllable devices to strobe at different times. Then, the device configuration engine 130 may distinguish the controllable devices from each other based on when the device strobes. In this manner, the determined location and other descriptive information can be associated with the correct controllable device (e.g., so a user may use the location or descriptive information to select a controllable device to control).

In some implementations, the device configuration engine 130 may determine a name for a controllable device based on one or more of the type of the controllable device, the room in which the controllable device is located, the presence and types of other controllable devices within the room, the objects in the room, the objects near the controllable device, and the relative location of the controllable device with respect to those objects. For example, the device configuration engine 130 may generate the name "Green Lamp" for a controllable light bulb mounted in a green lamp. The name may be generated based on recognizing objects, such as a green lamp, in the physical space based on image data captured by the camera assembly 152. In some situations, the name is generated based on recognizing an object in the physical space that the controllable device is plugged into or physically connected to. If multiple controllable light bulbs are identified as being plugged into the green lamp, a control group may be generated to allow for common control of all of those controllable light bulbs. A name, such as "Lights in the Green Lamp," may be generated for the control group that reflects that the group includes multiple controllable devices.

In some implementations, the name may be generated based on one or more recognized objects that are near to the controllable device. For example, if a couch is recognized as being near a controllable light bulb a name may be generated based on the presence of the couch (e.g., "Light bulb near Couch"). Additionally, a room type may be included in a generated name. For example, if it is determined that a controllable device is disposed in a room that is likely to be a living room the name "Light bulb in Living Room" may be generated. The type of room may be inferred from the objects identified in the room and the features extracted from image data of the room. In some implementations, the type of room may be retrieved from a representation of the space that includes room descriptors.

Various implementations may use different thresholds for determining when an object is near to a controllable device. In some implementations, the name may be generated based on the nearest object that is recognized in the physical space. In some implementations, the name is generated based on the nearest object of a specific type or types that is recognized in the physical space. For example, recognized objects may be compared to a list of objects types that may be used in generating names. The list of object types may include furniture and other similar items that are unlikely to move or change frequently (e.g., proximity to a couch, table, or houseplant may be useful in a generated name, while proximity to a banana or pencil is unlikely to be useful). In some implementations, a name may be generated based on multiple nearby recognized objects.

In some implementations, a name may be generated based on relative location with respect to one or more recognized objects. For example, the name "Lamp on Left Side of Couch" or the name "Lamp between Couch and House Plant" may be generated based on the objects recognized in the physical space. In some implementations, names based on relative location are generated only when multiple similar controllable devices are present and when a name based on proximity to an object is insufficient to distinguish the controllable device (e.g., when two lamps are disposed on opposite sides of a couch).

The scene recognition engine 132 recognizes objects within a physical space. For example, the scene recognition engine 132 may recognize objects based on image data captured with the camera assembly 152. The scene recognition engine 132 may include a machine learning model that has been trained to recognize various objects based in image data. Examples of machine learning models that may be used by the scene recognition engine 132 include but are not limited to neural networks and convolutional neural networks. In some implementations, the scene recognition engine 132 may be configured to recognize a limited list of object types. The list of object types may be selected based on the object types being useful in naming controllable devices or determining room types.

The scene recognition engine 132 may also recognize other aspects of the physical space such as the presence of walls, floors, ceilings, and other surfaces based on, for example, features extracted from image data. The scene recognition engine 132 may determine properties of a physical space, such as the approximate dimensions of a room.

The device identification engine 134 identifies a controllable device within a physical space. In some implementations, the device identification engine 134 identifies a controllable device based on a location of the computing device 102 within the physical space (e.g., as determined by the location determination engine 120). In some implementations, the device identification engine 134 identifies a controllable device based on a 6-dof pose (i.e., a location and orientation) of the computing device 102 within the physical space. The device identification engine 134 may identify a controllable device based on the computing device 102 being in proximity to the controllable device. For example, the device identification engine 134 may identify a controllable device based on the controllable device being the only or the closest controllable device within a pre-defined threshold distance from the location of the computing device 102 as determined by the location determination engine 120. In some implementations, the controllable device is identified based on being the only controllable device within a room in which the location determination engine 120 has determined the computing device 102 is located. In at least some implementations, the device identification engine 134 may identify a device based on proximity based on the location determined by the location approximation engine 122 without using the location refinement engine 124 and/or without using image data captured by the camera assembly 152 (which may be expensive from a computation and battery usage perspective).

In some implementations, the device identification engine 134 may identify a controllable device based on the computing device 102 being aimed at the controllable device or being in proximity to the controllable device. In some implementations, the computing device 102 is aimed by orienting a top edge of the computing device 102 toward a target controllable device (e.g., like a traditional remote control is aimed at a television). In some implementations, the computing device 102 is aimed by orienting a back surface of the computing device 102 at the controllable device (e.g., as would be done when taking a picture of the controllable device using a traditionally placed mobile phone camera lens). In some implementations, the device identification engine 134 identifies the device based at least in part on data from the sensor system 150 such as image data from the camera assembly 152 or orientation data from the IMU 154. The device identification engine 134 may identify a controllable device based on a 6-dof pose of the computing device 102 (e.g., as determined by the location refinement engine 124).

The device control engine 136 allows a user to control devices (which may be referred to as controllable devices) in a physical space, such as a building, using the computing device 102. In some implementations, the device control engine 136 allows a user to control a specific controllable device based on the computing device 102 being aimed at the controllable device. For example, when the user aims a computing device 102 at a controllable device, the device control engine 136 may use the device identification engine 134 to identify the device at which the user is aiming the computing device 102. For example, the device identification engine 134 may identify the controllable device based on the direction the user is aiming and a location of the computing device 102 as determined using the location determination engine 120. The device identification engine 134 may project a ray from the determined location in the direction in a representation of the physical space and then determine whether the ray intersects with or passes within a pre-defined distance of any controllable devices in the representations. In some implementations, controllable devices are associated with an intersection volume in the representation and a controllable device is identified when the ray intersects with the controllable device's associated intersection volume.

The device configuration data 138 may include location information, such as coordinates, and/or intersection volumes associated with controllable devices. The device configuration data 138 may also include names, descriptive information, and room information about the controllable device. In some implementations, the device configuration data 138 may also include user interfaces, command protocols for controlling and interacting with the controllable devices, and other information about the controllable devices (e.g., type information, notes, user permission or access control properties, etc.). In some implementations, the coordinates and/or intersection volumes are generated using the location determination engine 120. For example, the location of a controllable device may be indicated by a user aiming the computing device 102 at the controllable device from within the physical space. In some implementations, the coordinates and/or intersection volumes are retrieved from the location data source 106, which may store information about controllable devices provided by multiple users.

The location data 140 may store information about one or more locations. In some implementations, the location data 140 may store (or cache) data retrieved from the location data source 106. The location data 140 may include two-dimensional or three-dimensional representations of a physical space. The location data 140 may also store features, such as visual features of a physical space that may be used to estimate a location of the computing device 102 based on image data captured by the camera assembly 152. The location data 140 may also include one or more of room labels, dimensions, and descriptions, and item labels and descriptions for a physical space.

The user interface engine 142 generates user interfaces. The user interface engine 142 may also cause the client computing device 102 to display the generated user interfaces. The generated user interfaces may, for example, display information about controllable devices, including their relative location with respect to the direction the computing device 102 is being aimed. For example, the user interface engine 142 may generate a user interface that includes arcuate user interface elements, or circular user interface elements, or radial user interface elements, with icons representing controllable devices placed on the perimeter of the element at locations determined based on an angular offset from the aiming direction of the computing device. In some implementations, the user interface engine 142 generates a user interface includes one or more user-actuatable controls that are each associated with commands for a controllable device. For example, a user may actuate one of the user-actuatable controls (e.g., by touching the control on a touchscreen, clicking on the control using a mouse or another input device, or otherwise actuating the control). In some implementations, the user interface may be configured to recognize gestures or movements of the computing device 102 as user inputs. For example, the user interface engine 142 may generate a user input that triggers a command for a controllable device when a user-actuatable control on the user interface is touched and held while the computing device 102 is rotated such that an edge of the computing device 102 is tipped up or down. This user input may cause the computing device 102 to transmit a command to increase/decrease volume or brightness to a controllable device.

In some implementations, the location determination engine 120, the location approximation engine 122, the location refinement engine 124, the device configuration engine 130, the scene recognition engine 132, the device identification engine 134, the device control engine 136, and the user interface engine 142 may include instructions stored in the memory 110 that, when executed by the processor assembly 112, cause the processor assembly 112 to perform operations described herein to determine locations, configure controllable device based on the locations, and interact with the controllable devices based on the locations. The device configuration data 138 may include data stored in memory and, in at least some implementations, instructions that, when executed by the processor assembly 112, cause the processor assembly 112 to display user interfaces and issue commands to interact with various control devices.

The device configuration engine 130 and the device control engine 136 may cause the computing device 102 to display a user interface generated by the user interface engine 142 based on input received from the camera assembly 152, the IMU 154, and/or other components of the sensor system 150. For example, the IMU 154 may detect motion, movement, and/or acceleration of the computing device 102 and/or an associated head mounted display device (HMD). The IMU 154 may include various different types of sensors such as, for example, an accelerometer, a gyroscope, a magnetometer, and other such sensors. An orientation of the computing device 102 (and/or the associated HMD) may be detected and tracked based on data provided by the location determination engine 120 and/or sensors included in the IMU 154. The detected orientation of the computing device 102 (and/or the associated HMD) may allow the system to determine a direction in which the user is aiming. Based on the detected orientation, the device control engine 136 may use the device identification engine 134 to determine a controllable device at which the user is aiming and cause the user interface engine 142 to generate an associated user interface for interacting with the controllable device. In some implementations, the device configuration engine 130 may use the determined direction to identify a location in a representation of the physical space surrounding the user at which the user is aiming the computing device 102. In some implementations, identifying the location in three-dimensional space may require determining a direction the user is aiming multiple times from different locations within the physical space.

Although not specifically shown in FIG. 1, some implementations may include an HMD. In some implementations, the HMD may be a separate device from the computing device 102. In some implementations, the computing device 102 may be embodied in the HMD. In some implementations, in which the computing device 102 is separate from the HMD, the computing device 102 may communicate with the HMD wirelessly, or via a cable. For example, the computing device 102 may transmit video signals and/or audio signals to the HMD for display for the user, and the HMD may transmit motion, location, and/or orientation information to the computing device 102.

The computing device 102 may also include various user input components (not shown) such as a controller that communicates with the computing device 102 using a wireless communications protocol. In some implementations, the computing device 102 may communicate via a wired connection (e.g., a Universal Serial Bus (USB) cable) or via a wireless communication protocol (e.g., any WiFi protocol, any BlueTooth protocol, Zigbee, etc.) with a head-mounted display (HMD) device (not shown). In some implementations, the computing device 102 is a component of the HMD and may be contained within a housing of the HMD.

The memory 110 can include one or more non-transitory computer-readable storage media. The memory 110 may store instructions and data that are usable by the computing device 102 to determine a coordinates of a target location based on a location of the computing device 102 and/or to identify a target controllable device based on a user aiming at the target controllable device.

The processor assembly 112 includes one or more devices that are capable of executing instructions, such as instructions stored by the memory 110, to perform various tasks associated with position-based location indication and device control. For example, the processor assembly 112 may include a central processing unit (CPU) and/or a graphics processor unit (GPU). For example, if a GPU is present, some image/video rendering tasks, such as generating and displaying a user interface for a controllable device may be offloaded from the CPU to the GPU.

The communication module 114 includes one or more devices for communicating with other computing devices, such as the location data source 106. The communication module 114 may communicate via wireless or wired networks, such as the network 108.

The IMU 154 detects motion, movement, and/or acceleration of the computing device 102. The IMU 154 may include various different types of sensors such as, for example, an accelerometer, a gyroscope, a magnetometer, and other such sensors. A location and orientation of the computing device 102 may be detected and tracked based on data provided by the sensors included in the IMU 154. In some implementations, the IMU 154 is configured to detect a location and orientation of an HMD, which may allow the system to detect and track the user's gaze direction and head movement.

The network 108 may be the Internet, a local area network (LAN), a wireless local area network (WLAN), and/or any other network. A computing device 102, for example, may communicate with the communication hub 104 and the location data source 106 via the network 108.

Figure 2:
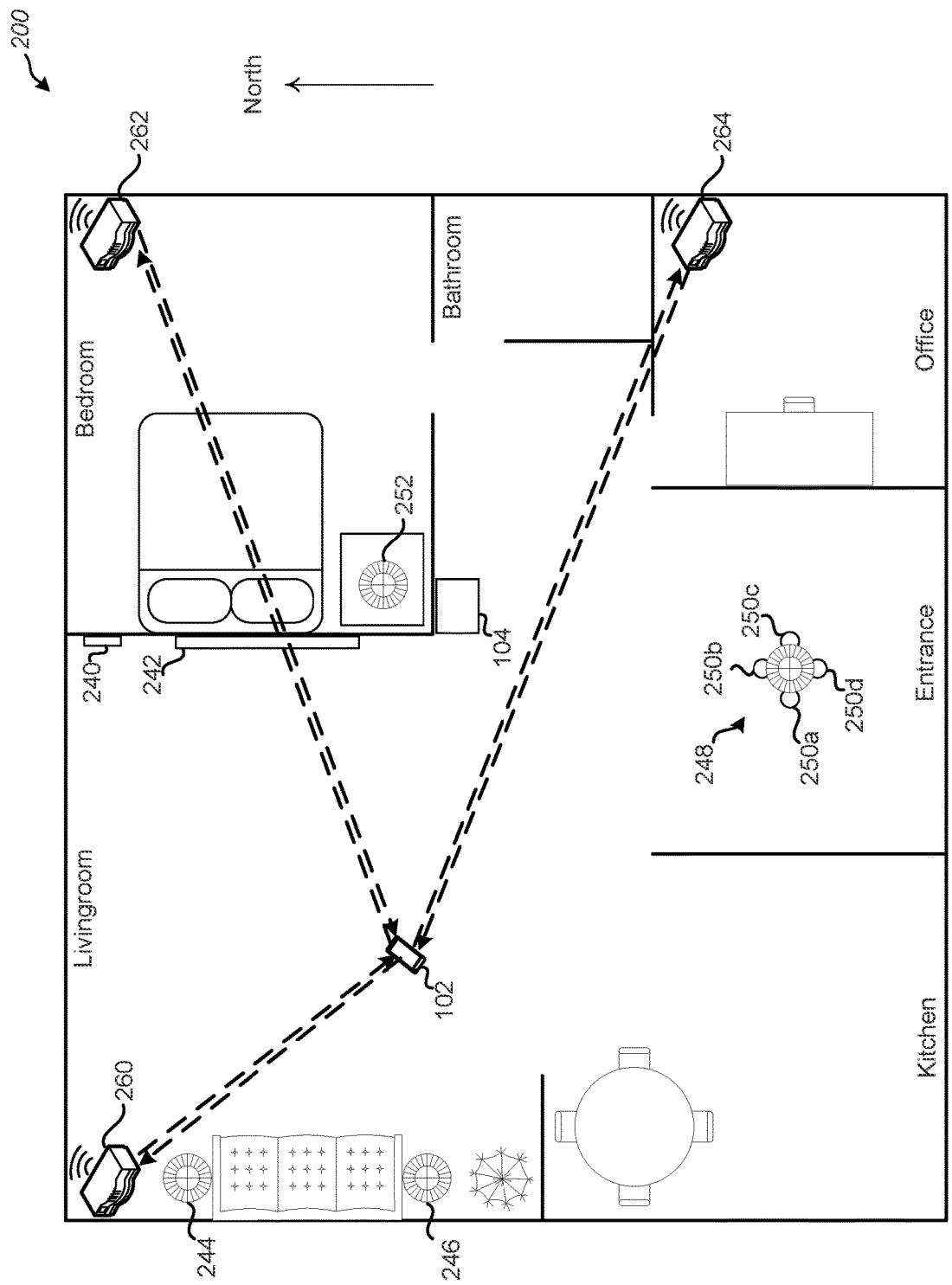
FIG. 2 is an overhead view of an example physical space containing the computing device and communication hub of FIG. 1 and multiple controllable devices and wireless communication devices.

FIG. 2 is an overhead view of an example physical space 200 containing the computing device 102, the communication hub 104, controllable devices 240, 242, 244, 246, 250a, 250b, 250c, 250d, and 252, and wireless communication devices 260, 262, and 264. In this example, the controllable devices 250a, 250b, 250c, and 250d are grouped as controllable device group 248. In this example, the controllable device 240 is a thermostat, the controllable device 242 is a television, and the controllable devices 244, 246, 250a, 250b, 250c, 250d, and 252 are light bulbs.

In some implementations, the computing device 102 may determine a first location estimate based on round-trip times for communicating with the wireless communication devices 260, 262, and 264. The first location estimate may include a location within a representation of the physical space 200. The representation of the physical space 200 may be two dimensional or three dimensional. In some implementations, the first location estimate may include an identification of one or more rooms within the physical space within which the computing device is likely to be located based on the measured round-trip times. In some implementations, the first location estimate may be denominated in distances from one or more of the wireless communication devices 260, 262, or 264. In some implementations, the first location estimate is represented by two coordinate values that identify a location within a two dimensional representation of the physical space 200. In some implementations, the first location estimate is represented by three coordinate values that identify a location within a three dimensional representation of the physical space 200.

A user may operate the computing device 102 to configure the controllable devices 240, 242, 244, 246, 250a, 250b, 250c, 250d, and 252. For example, the user may initiate a configuration process using the computing device 102 by actuating a control element displayed on a user interface screen displayed by the computing device 102 (e.g., by touching a virtual button) or by capturing image data using the camera assembly 152 that includes a barcode, QR code, or defined image (e.g., an image, barcode, or QR code printed on packaging material for the controllable device, instructions accompanying the controllable device, or even on a surface of the controllable device). The computing device 102 may then send an instruction to the communication hub 104 to indicate that the configuration process should be initiated. In some implementation, the user may initiate a configuration process by pressing a button on the communication hub 104.

Responsive to initiating the configuration process, the communication hub 104 may transmit instructions to one or more of the controllable devices to trigger the controllable devices to perform an identification action. In some implementations, the computing device 102 may communicate with some or all of the controllable devices directly to trigger the identification actions. In some implementations, all of the controllable devices are instructed to perform an identification action. In some implementations, all of the controllable devices that have not been previously configured (e.g., unconfigured controllable devices) are instructed to perform an identification action. In some implementations, one or more controllable devices that a user has specifically identified are instructed to perform an identification action.

Identification actions may allow the computing device 102 to recognize the presence of and/or location of the controllable devices. In some implementations, the identification action is a visual cue generated by the controllable devices that can be detected by the computing device 102. For example, the controllable devices may blink or strobe according to a specific pattern or at a specific time so that the computing device 102 may recognize the presence and location of a particular controllable device based on capturing video or detecting the blinking or strobing via the camera assembly 152. In some implementations, the identification action may include the controllable device displaying one or more specific images, which the computing device 102 may recognize when the controllable device is within the field of view of the camera assembly 152. The identifiable action may also include generating a sound or pattern of sound, including sounds that are typically inaudible to humans (e.g., ultrasound or infrasound).

For example, in the physical space 200, the controllable device 240 (a thermostat) may perform an initiation action by causing an LED to blink on for 80 milliseconds once every second. When a user aims a lens of the camera assembly 152 of the computing device 102 at the controllable device 240, the device configuration engine 130 may process the image data captured by the camera assembly 152 to identify the blinking LED. Based on identifying the location of the blinking LED in the image frame, the relative location of the controllable device 240 may then be determined. And the relative location of the controllable device 240 may be combined with a location estimate of the location of the computing device 102 to determine a location of the controllable device 240. The determined location of the controllable device 240 may be stored with respect to a representation of the physical space 200 (e.g., in the location data 140 or the location data source 106).

Similarly, the controllable devices 244, 246, 250*a*, 250*b*, 250*c*, 250*d*, and 252 (light bulbs) may perform an identification action by blinking on during the configuration process for a specific interval of time during and/or according to a specific pattern. If more than one controllable device is being configured at the same time, each of the controllable devices may be instructed to blink on at different specific times, for different intervals of time, and/or according to a different pattern. When a user aims a lens of the camera assembly 152 of the computing device 102 at these controllable devices, the device configuration engine 130 may process the image data captured by the camera assembly 152 to identify the blinking lights and determine the time, interval of time, and pattern of blinking. Based on the determined time, interval of time, and pattern, each controllable device within the field of view may be individually identified. The locations of the identified controllable devices can be determined with respect to a representation of the physical space 200 as has been previously described. These locations can then be stored in association within an identifier of the controllable device that allows for sending instructions to the controllable device.

In some implementations, when the locations of multiple of the controllable devices are determined to be within a threshold distance of each other, the controllable devices may be grouped together. In this example, the controllable devices 250*a*, 250*b*, 250*c*, and 250*d* are grouped together as controllable device group 248. The controllable device group 248 may allow the member controllable devices to be treated as a single controllable device from a user perspective (e.g., so that a user only needs to send a single command to the group to control all of the member devices). In some implementations, the controllable devices are grouped when all of the controllable devices are within a threshold distance of each other. In some implementations, controllable devices are included in a group when the controllable device is within a threshold distance of at least one other controllable device in the group.

The controllable device 242 (a television) may perform an identification action by displaying a specific image that can be used to identify the controllable device 242 and its location when a user aims the lens of a camera assembly 152 of the computing device 102 at the controllable device 242. The specific image may be displayed at a specific size. Based on the size of the specific image in the image data, the distance to the controllable device 242 may be inferred. Similarly, based on the orientation and any shearing of the image, the viewing angle of the computing device 102 may be determined.

As the controllable devices are identified and configured, various types of descriptive information may be generated about the controllable devices. For examples, the controllable devices may be associated with rooms in the physical space. The representation of the physical space may include room names. In some implementations, the room names are entered by a user. In some implementations, the room names are generated, at least in part, based on objects recognized within the room. For example, the scene recognition engine 132 of the computing device 102 may recognize a couch and a house plant in a room and generate (or suggest) that the room is a living room. Similarly, the scene recognition engine 132 of the computing device 102 may recognize a dining table, desk, or bed in various rooms and generate (or suggest) that the rooms be labeled kitchen, office, and bedroom respectively.

In some implementations, names are also generated for the controllable devices. The generated names may be based on one or more of the following: type of controllable device, room in which the controllable device is located, objects near the controllable device, relative location of the controllable device to the objects, and location within the room. For example, the device configuration engine 130 may generate the name "Living Room Thermostat" for the controllable device 240 based on the controllable device type and the room within which it is located. The device configuration engine 130 may determine that this name is sufficient to uniquely identify the controllable device 240 based on determining that there have been no other thermostat controllable devices identified in the living room. Similarly, the device configuration engine 130 may generate the name "Living Room TV" for the controllable device 242 for similar reasons.

With regard to the controllable devices 244 and 246, the device configuration engine 130 may determine that is necessary to include more descriptive information than just the room name because of the presence of multiple controllable light bulbs in the living room. For example, the device configuration engine 130 may generate the name "Living Room North Light Bulb" for the controllable device 244 by combing the controllable device type, room name, and location within the room. Similarly, in this example, the device configuration engine 130 may generate the name "Living Room South Light Bulb."

As another example, the device configuration engine 130 may generate the name "Living Room Light Bulb North of Couch" for the controllable device 244 by combing the controllable device type, room name, nearby object, and location relative to the object. Note, if only a single controllable light bulb was near the couch, the device configuration engine 130 may generate the name "Living Room Light Bulb Near Couch" as that name would include sufficient details to identify the controllable device. Continuing this example, the device configuration engine 130 may generate the name "Living Room Light Bulb South of Couch" for the controllable device 246 by combing the controllable device type, room name, nearby object, and location relative to the object. In some implementations, the device configuration engine 130 may generate the name "Living Room Light Bulb Between Couch and House Plant" for the controllable device 246 by combing the controllable device type, room name, nearby objects, and location relative to the nearby objects. The device configuration engine 130 may alternatively generate the name "Living Room Light Bulb Near House Plant" for the controllable device 246 by combing the controllable device type, room name, and nearby object as these properties would be sufficient to distinguish the controllable device 246 from the other controllable devices. In some implementations, the device configuration engine 130 may generate multiple name suggestions for a controllable device, which may then be presented to a user (e.g., on a user interface screen displayed on the computing device 102) so that the user could choose a name to store for the controllable device.

With regard to the controllable device group 248, the device configuration engine 130 may generate the name "Entrance Light Group" for the controllable device group 248 by combing the controllable devices type, room name, and fact that the controllable devices have been grouped. As another example, the device configuration engine 130 may generate the name "Bedroom Light" for the controllable device 252 by combing the controllable device type and the room name. Other names are possible as well, such as "Nightstand Light," which the device configuration engine 130 may generate based on recognizing a nightstand object below the controllable device 252.

Figure 3A:
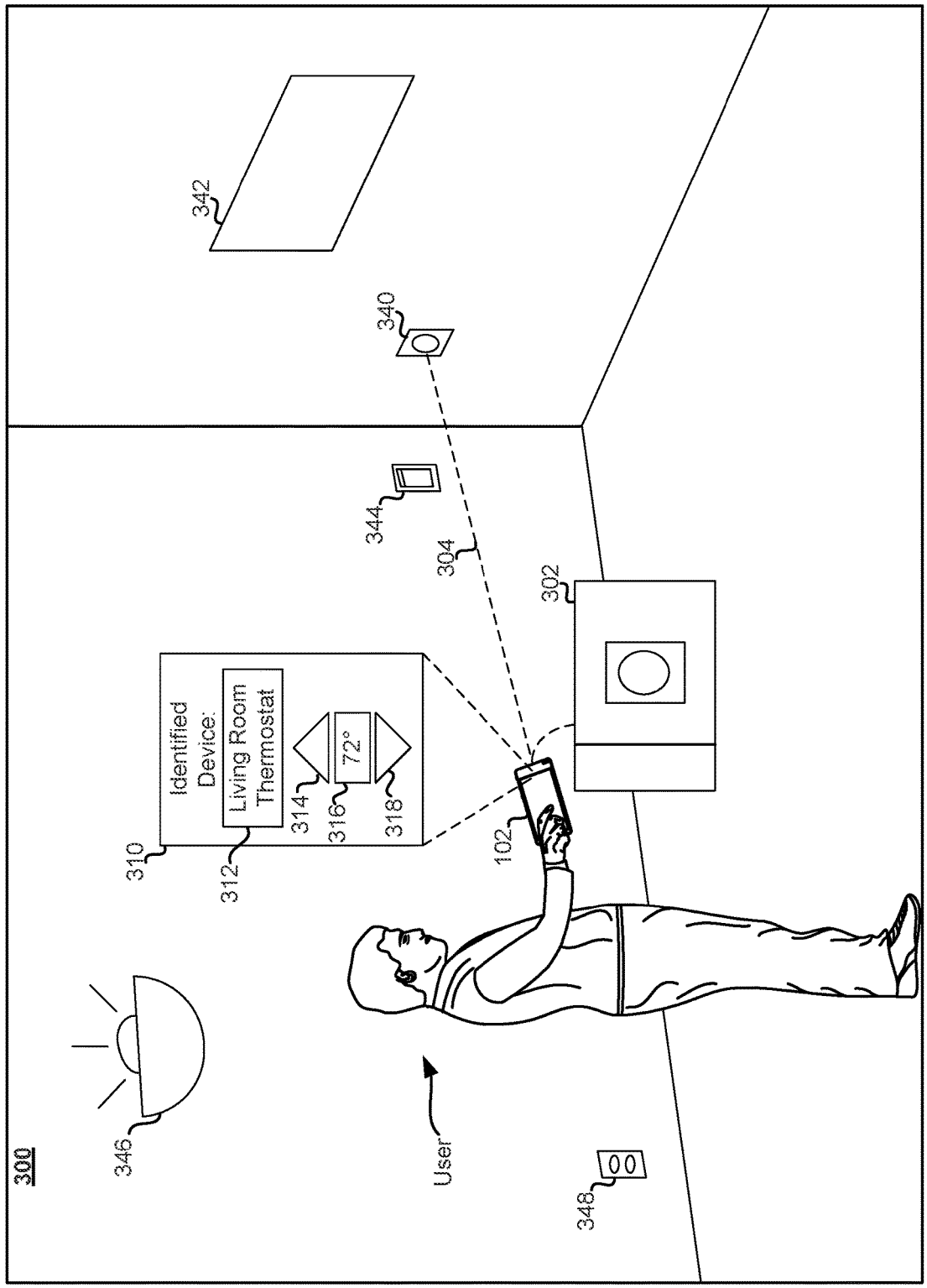
FIGS. 3A and 3B are third person view of an example physical space in which a user is interacting with a controllable device based on aiming the computing device of FIG. 1 at the controllable device.
Figure 3B:
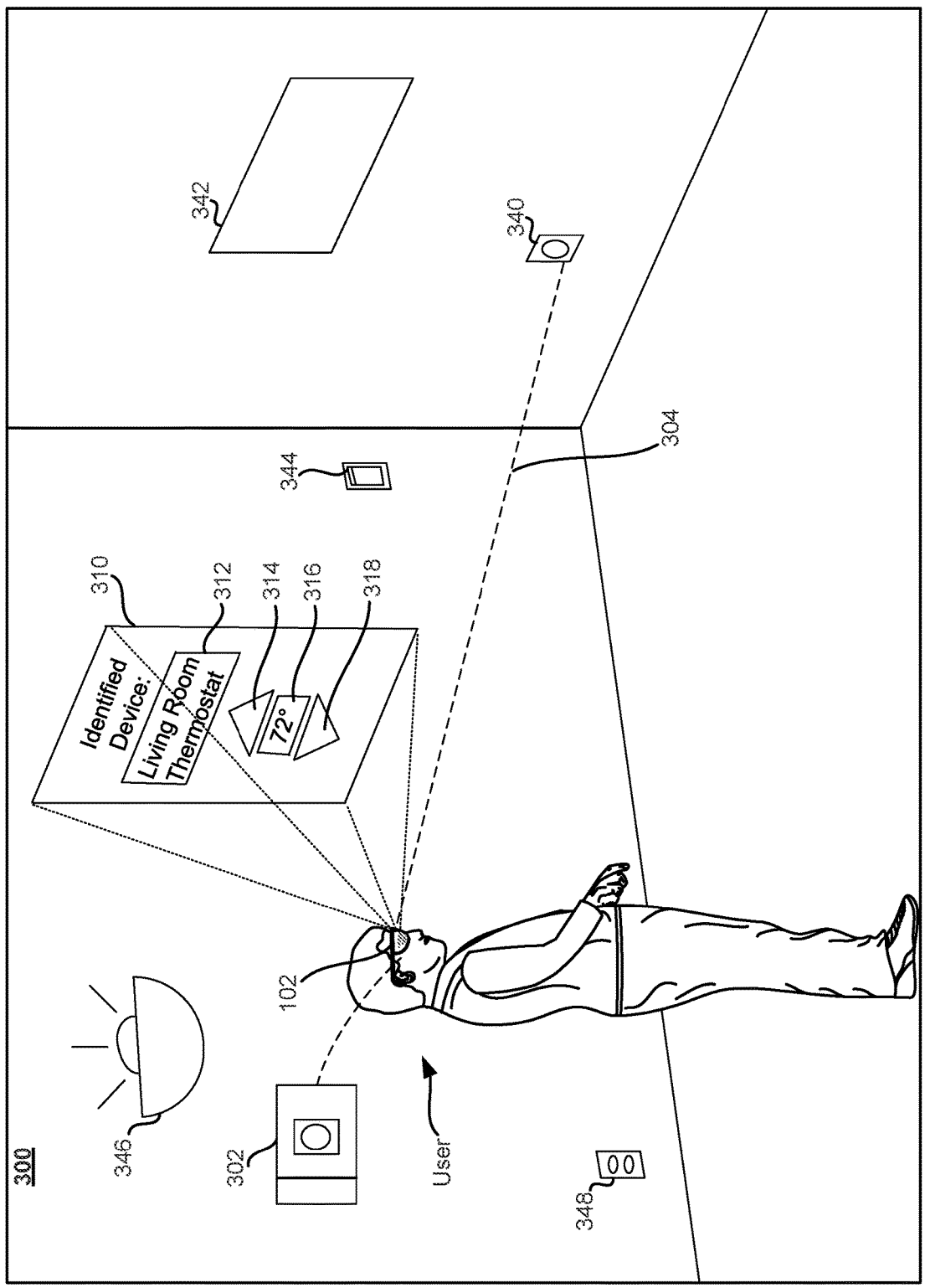

FIGS. 3A and 3B are third person view of an example physical space 300 in which a user is interacting with a controllable device 340 based on aiming, or pointing, or orienting the computing device 102 at the controllable device 340. In the exemplary implementation shown in FIG. 3A, the user is aiming the top edge of the computing device 102, in the form of a handheld device such as, for example, a smartphone, a handheld controller, and the like, at the controllable device 340. In the exemplary implementation shown in FIG. 3B, the user is aiming, or pointing, the computing device 102, embodied in the form of an HMD 102, or directing a head or eye gaze, in the direction of the controllable device 340. In other implementations, the user may aim the computing device 102 at the controllable device 340 differently (e.g., such as by aiming a camera of the computing device 102 at the controllable device 340). In some implementations, the user may aim at the controllable device 340 with a gesture, a head motion, or an eye motion. In some implementations, the computing device 102 may capture an image 302 based on the direction 304 that the computing device 102 is pointed, or aimed, or oriented. Based on the location of the computing device 102 (e.g., as determined using the location determination engine 120), the device identification engine 134 may identify the controllable device 340 in the image 302.

In some implementations, the computing device 102 generates a virtual ray, originating at the computing device 102 and extending from the computing in the direction 304 that the user is aiming, or pointing, the computing device 102. The computing device 102 compares the virtual ray along the direction 304 to previously defined locations of controllable devices that are stored in a representation of the physical space 300 to identify that the user is aiming at the controllable device 340.

In the example shown in FIGS. 3A and 3B, the controllable device 340 is a thermostat and the computing device 102 is displaying a user interface 310 for interacting with a thermostat. In particular, in the example shown in FIG. 3A, the user interface 310 is displayed on, for example, a display screen of the computing device 102. In the example shown in FIG. 3B, the user interface is displayed by the computing device 102 (in the form of the HMD 102) as, for example, augmented reality (AR) content that is visible to the user within the physical space 300. The user interface 310 shown in FIGS. 3A and 3B is just one example of a user interface that may be generated in this manner, and different implementations of the user interface will include different elements. In some implementations, the user interface 310 is generated based on the type of controllable device the user has selected, or identified, by aiming, or pointing the computing device 102 in a particular direction.

In the example shown in FIGS. 3A and 3B, the user interface 310 includes an information field 312, an increase control element 314, a temperature field 316, and a decrease control element 318. The information field 312 may, for example, display information about the controllable device 340 such as a device type, a name, a location, and/or a note previously entered by a user. The temperature field 316 may display a current temperature sensed by the controllable device 340 and/or a current temperature setting of the controllable device 340. The increase control element 314 and the decrease control element 318 may be actuated to adjust a temperature setting of the controllable device 340.

In addition to the controllable device 340, the physical space 300 also includes controllable device 342, 344, 346, and 348. In this example, the controllable device 342 is an electronic display device, such as a television, a monitor, or other such display device. Also, in this example, the controllable device 344 is a switch, the controllable device 346 is a light, and the controllable device 348 is an outlet. The user may identify any of these controllable devices by aiming at a selected one of the controllable devices 342/344/346/348 to access or control the selected controllable device. In response to the user aiming at one of the exemplary controllable devices 342/344/346/348, the computing device 102 may generate a user interface that provides elements specific to controlling the identified controllable device.

As noted above, in some implementations, the user interface 310 may be displayed to the user on a display device of the computing device 102, as shown in FIG. 3A. In some implementations, the user interface 310 may be displayed as AR content in the user's field of view, by the HMD 102 worn by the user, as shown in FIG. 3B. In some implementations, the user interface 310 may be overlaid on an image (or video feed being captured by the camera assembly 152 of the computing device 102) of the physical space 300.

Simply for purposes of discussion and illustration, a computing device 102 in the form of a handheld device such as, for example, a smartphone or a controller and the like, will be described and illustrated in various exemplary implementations. However, the principles to be described herein may be applied to other types of computing devices, such as, for example, wearable computing devices such as, for example, HMDs, wrist worn devices, and the like, tablet computing devices, convertible computing devices, notebook/laptop computing devices, and other such mobile computing devices equipped with sensing capability, display capability and the like.

Figure 4:
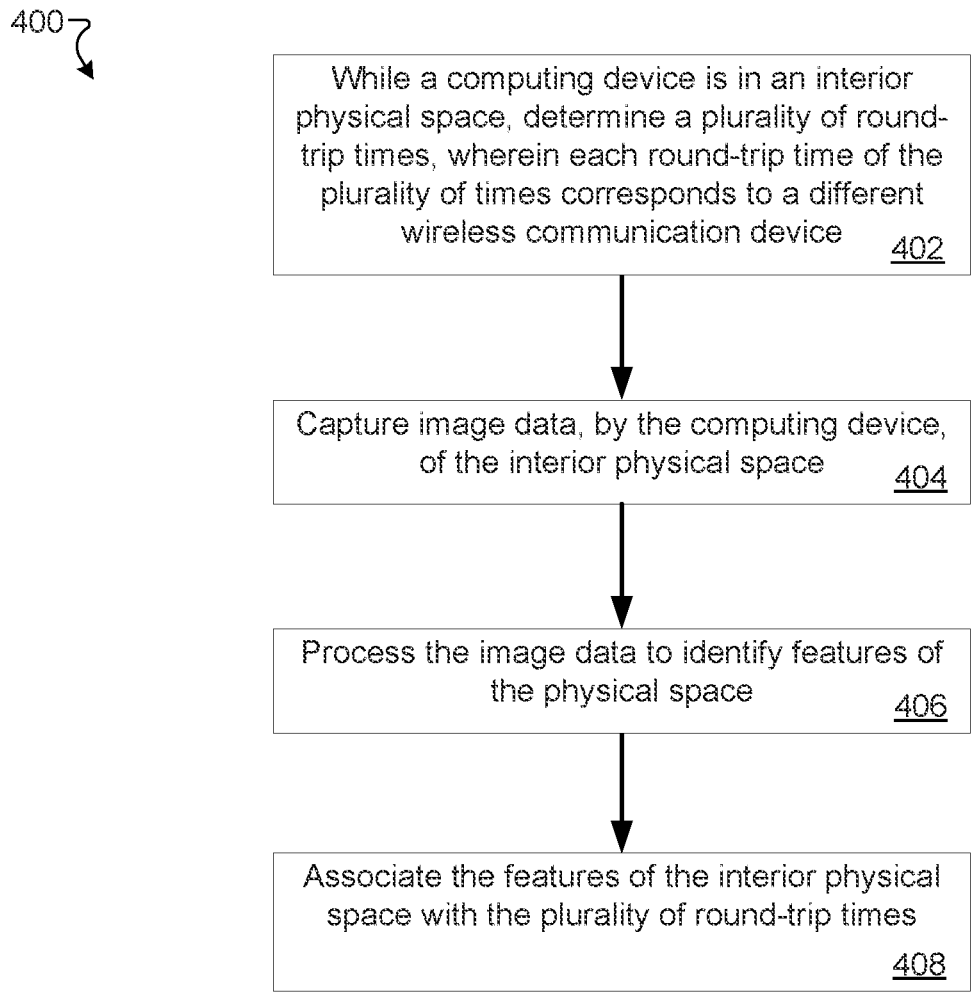
FIG. 4 is a diagram of an example method of associating input signals of a first signal type in an interior space with input signals of a second signal type, in accordance with implementations described herein.

FIG. 4 is a diagram of an example method 400 of associating input signals of a first signal type in an interior space with input signals of a second signal type. In this example, the method 400 is being used to associate round-trip time signals with image data signals. In some implementations, the method 400 is used to generate a representation of the interior space, which may be used to estimate locations within the interior space. In some implementations, the method 400 is performed by the computing device 102 multiple times while the computing device 102 is moved around the interior space. In this manner, the method 400 can be used to build a mapping between the first input signal type (round-trip times) and the second input signal type (e.g., the image data) in multiple locations within the interior space.

At operation 402, while the computing device 102 is in an interior physical space, a plurality of round-trip times are determined. Each round-trip time of the plurality of times may correspond to a different wireless communication device. In some implementations, the wireless communication devices are all disposed within the physical space that is being mapped. In some implementations, the wireless communication devices for which round-trip times are determined are disposed outside of the interior physical space too. For example, if a single apartment within an apartment building is being mapped, round-trip times may be determined with respect to wireless communication devices within the apartment and within other apartments in the apartment building.

At operation 404, the computing device 102 captures image data of the interior physical space. At operation 406, the image data is processed to identify features of the physical space. For example, the features may include wall, floor, corner, and edge locations. In some implementations, dimensions of the interior physical space (or rooms within the physical space) are determined. In some implementations, distances between the computing device 102 and the determined physical space. In some implementations, objects within the interior physical space may also be recognized. Based on the recognized features and/or objects, some implementations, may infer a room name or type.

At operation 408, the features of the interior physical space are with the plurality of round-trip times that were determined. For example, the round-trip times may be associated with a representation of the interior physical space that is generated based on the recognized features and/or objects. In some implementations, the determined round-trip times may be stored at locations within the interior physical space that are determined based on estimated distances between the computing device 102 and the recognized features and/or objects.

Figure 5:
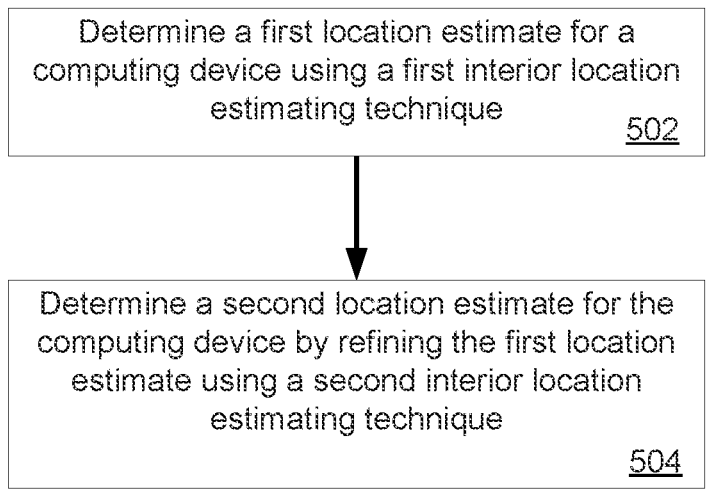
FIG. 5 is a diagram of an example method of determining a location of a computing device within a physical space, in accordance with implementations described herein.

FIG. 5 is a diagram of an example method 500 of determining a location of a computing device within a physical space. For example, the method 500 may be performed by the location determination engine 120 of the computing device 102 to determine a location within a physical space, such as an interior physical space.

At operation 502, a first location estimate for a computing device is determined using a first interior location estimating technique. For example, the first location estimating technique may be performed by the location approximation engine 122. In some implementations, the location approximation engine 122 uses round-trip times (e.g., to wireless communication devices) to generate the first location estimate. For example, round-trip times captured by the computing device may be compared to round-trips times stored in a representation of a physical space or otherwise associated with features of the physical space (e.g., as determined using the method 400). In at least some implementations, the first location estimate is generated without capturing image data.

At operation 504, a second location estimate for a computing device is determined by refining the first location estimate using a second interior location estimating technique. For example, the second location estimating technique may be performed by the location refinement engine 124. In some implementations, the location refinement engine 124 captures image data and extracts features of the interior physical space from the image data to determine the second location estimate. For example, features extracted from the image data may be compared to known features in a representation of the interior physical space (e.g., to determine, based on the size, orientation, and/or orientation of the features in the image data, from where within the physical space the image data was captured). In some implementations, only a portion of the representation is accessed or retrieved to generate the second estimate.

Figure 6:
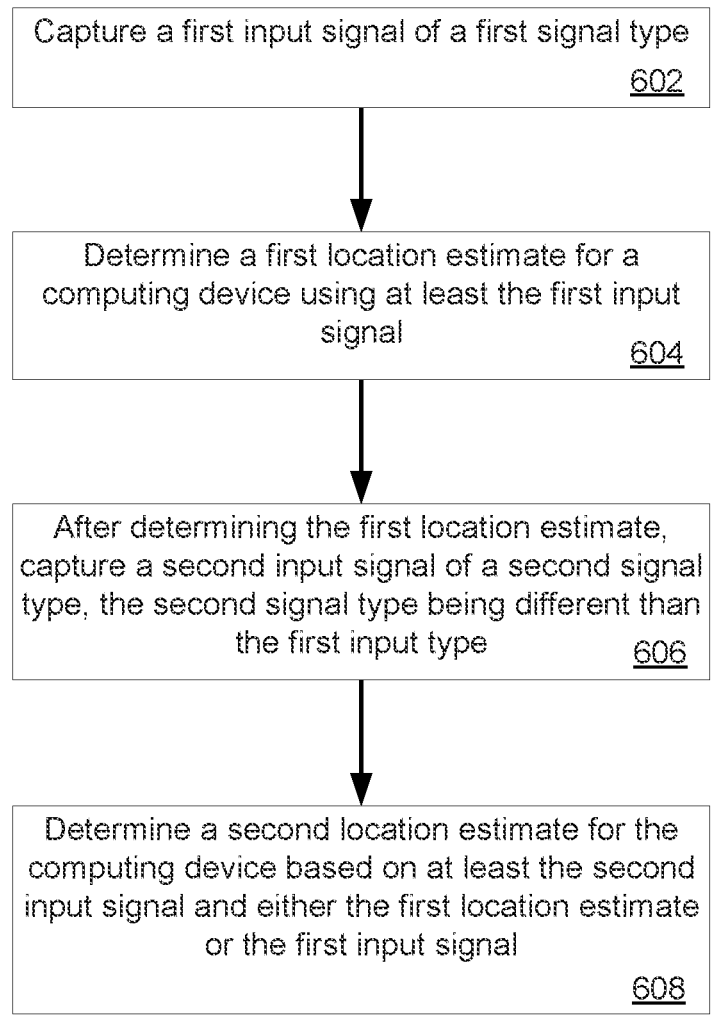
FIG. 6 is a diagram of an example method of determining a location of a computing device within a physical space, in accordance with implementations described herein.

FIG. 6 is a diagram of an example method 600 of determining a location of a computing device within a physical space. For example, the method 600 may be performed by the location determination engine 120 of the computing device 102 to determine a location within a physical space, such as an interior physical space.

At operation 602, a first input signal of a first signal type is captured. For example, wireless communication signals may be captured to determine round-trip time to one or more wireless communication devices. At operation 604, a first location estimate for a computing device is determined using at least the first input signal.

At operation 606, after determining the first location estimate, a second input signal of a second signal type is captured. The second signal type may be different than the first signal type. For example, the second signal type may be optical signals that are captured by a camera assembly 152 as image data. At operation 608, a second location estimate for the computing device is determined based on at least the second input signal and either the first location estimate or the first input signal. In at least some implementations, capture of the second input signal is not enabled until after the first location estimate has been determined.

Figure 7:
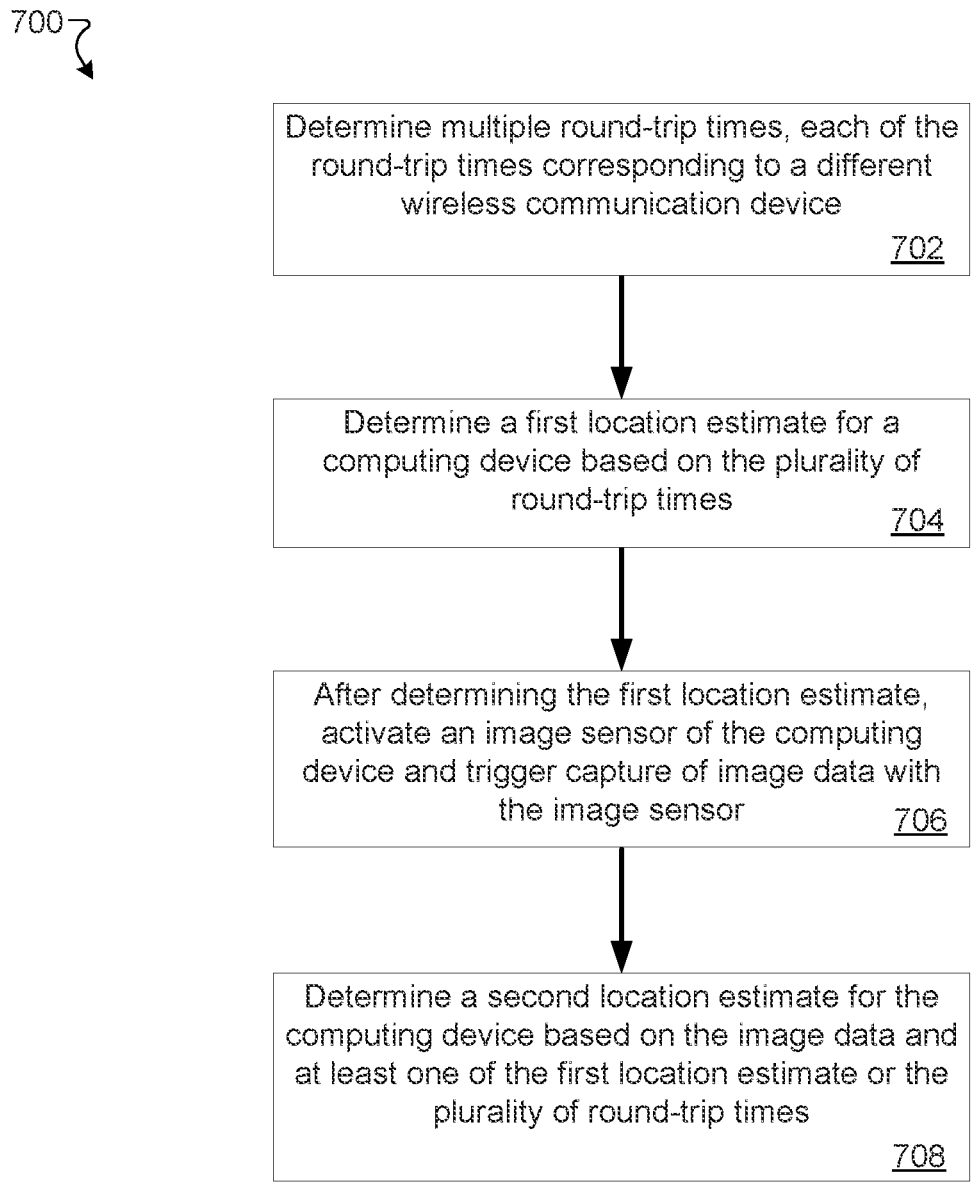
FIG. 7 is a diagram of an example method of determining a location of a computing device within a physical space, in accordance with implementations described herein.

FIG. 7 is a diagram of an example method 700 of determining a location of a computing device within a physical space. For example, the method 700 may be performed by the location determination engine 120 of the computing device 102 to determine a location within a physical space, such as an interior physical space.

At operation 702, multiple round-trip times are determined. For example, each of the round-trip times may correspond to a round-trip time to communicate with a different wireless communication device. At operation 704, a first location estimate for the computing device 102 is determined based on the round-trip times.

At operation 706, after determining the first location estimate, an image sensor (e.g., the camera assembly 152) of the computing device 102 is activated and capture of image data with the image sensor is triggered. In at least some implementations, the image sensor may remain inactive until operation 706. In some implementations, the first location estimate is determined while the image sensor is inactive and image data is not being captured. Less power may be used when the image sensor is inactive. At operation 708, a second location estimate for the computing device 102 is determined based on the image data and at least one of the first location estimate or the round-trip times. For example, the first location estimate may be used to retrieve a representation of the physical space (or a portion of the representation). As another example, the round-trip times and the image data (or features of the physical space extracted from the image data) may be used as input to a machine learning model that generates a location estimate for the computing device 102.

Figure 8:
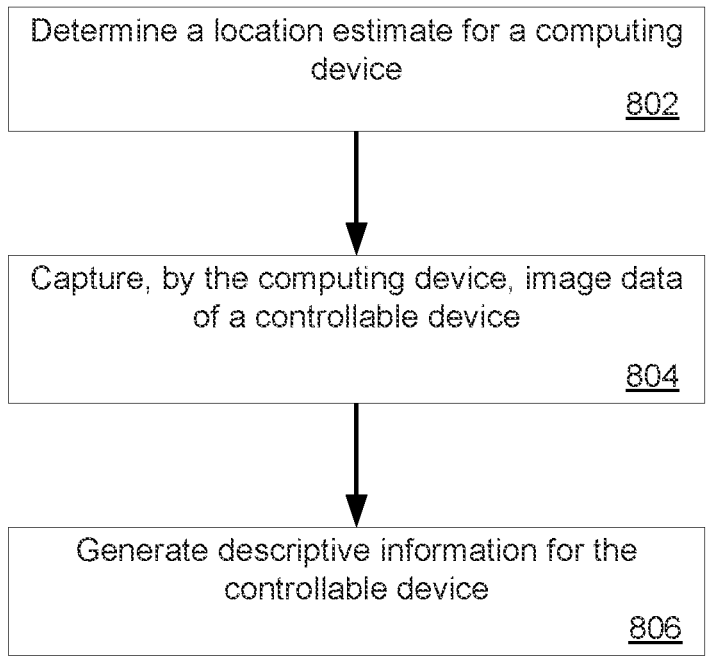
FIG. 8 is a diagram of an example method of generating descriptive information for a controllable device, in accordance with implementations described herein.

FIG. 8 is a diagram of an example method 800 of generating descriptive information for a controllable device. For example, the method 800 may be performed by the device configuration engine 130 of the computing device 102 to configure a controllable device in a physical space. In some implementations, the method 800 is performed in response to the user initiating a configuration process for a controllable device.

At operation 802, a location estimate for the computing device 102 is determined. The location estimate may be generated according to any of the techniques described herein or by any other location determination techniques.

At operation 804, image data of the controllable device is captured. The image data may be captured, for example, using the camera assembly 152 of the computing device 102. In some implementations, the image data includes a portion of the physical space in which the controllable device is located. In some implementations, the computing device 102 may display the image data on the display device 116 as it is being captured or after it is being captured. In some implementations, the device identification engine 134 may identify the controllable device in the image data and may generate a visual indicator on the display device 116. The visual indicator identifies the controllable device for the user of the computing device 102 (e.g., so that the user can confirm or correct the identification of the controllable device). As has been described herein, the device identification engine 134 may identify the controllable device in the image based on detecting an identification action being performed by the controllable device within the image data.

At operation 806, descriptive information for the controllable device is generated. The descriptive information may be based, at least in part, on the determined location estimate for the computing device. For example, a relative location of the controllable device with respect to the computing device 102 is determined based on the image data. Based on the relative location and the location estimate for the computing device, a location for the controllable device may be determined. The descriptive information may include the location, name, and/or room name for the device. The room name may be determined based on comparing the location to a representation of the physical space. In some implementations, the room name may be determined based on the image data. For example, the room name may be inferred based on features of the physical space extracted from the image data or objects recognized within the physical space based on the image data. The room name may also be determined based on comparing the image data to a representation of the physical space. In some implementations, a name is generated based on the determined room, the controllable object type, or the types of objects recognized in the physical space near the controllable device.

Figure 9:
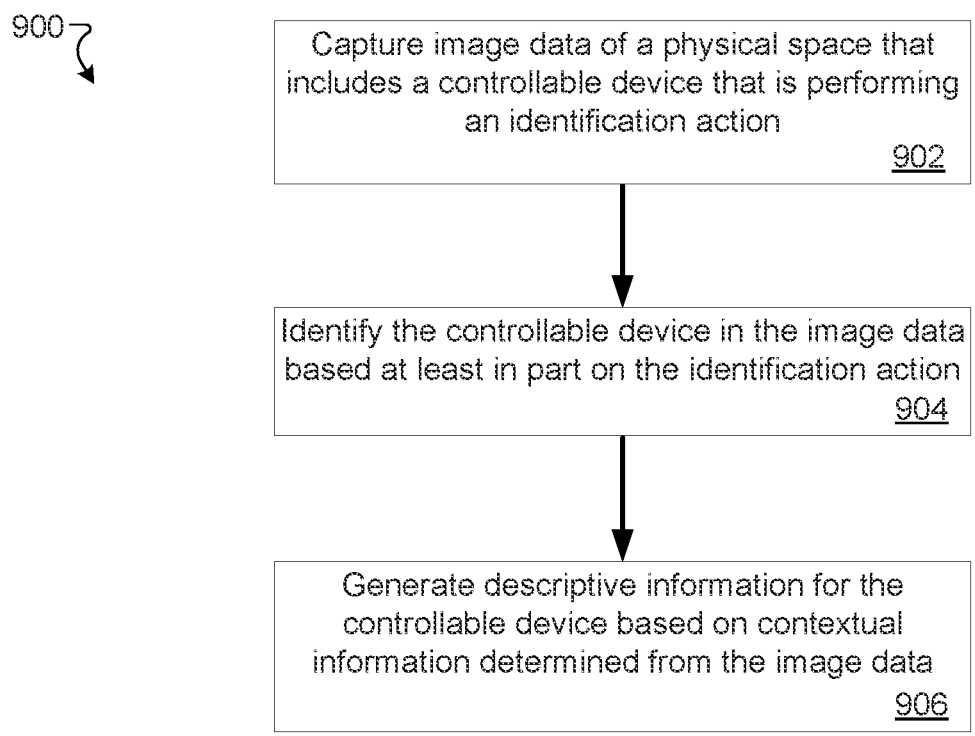
FIG. 9 is a diagram of an example method of generating descriptive information for a controllable device, in accordance with implementations described herein.

FIG. 9 is a diagram of an example method 900 of generating descriptive information for a controllable device. For example, the method 900 may be performed by the device configuration engine 130 of the computing device 102 to configure a controllable device in a physical space. In some implementations, the method 900 is performed in response to the user initiating a configuration process for a controllable device.

As operation 902, image data of the controllable device performing an identification action is captured. The image data may be captured, for example, using the camera assembly 152 of the computing device 102. The image data may include images or video.

At operation 904, the controllable device is identified within the image data based at least in part on the identification action. For example, video data captured by the camera assembly 152 may be analyzed to identify a light that blinks in a manner that is consistent with the identification action performed by the controllable device (e.g., at a specific time, for a specific interval, and/or with a specific frequency).

At operation 906, descriptive information is generated for the controllable device based on contextual information determined from the image data. In some implementations, the image data includes a portion of the physical space in which the controllable device is located. The contextual information may be determined from the image data of the physical space in which the controllable device is located. For example, objects may be recognized within the image data and the presence of those objects may be used to generate descriptive information for the controllable device, such as a name for the controllable device. The detected objects may also be used to infer the room type in which the controllable device is located. The room type may be used to generate a name for the controllable device. The controllable device may also be associated with the room.

Figure 10:
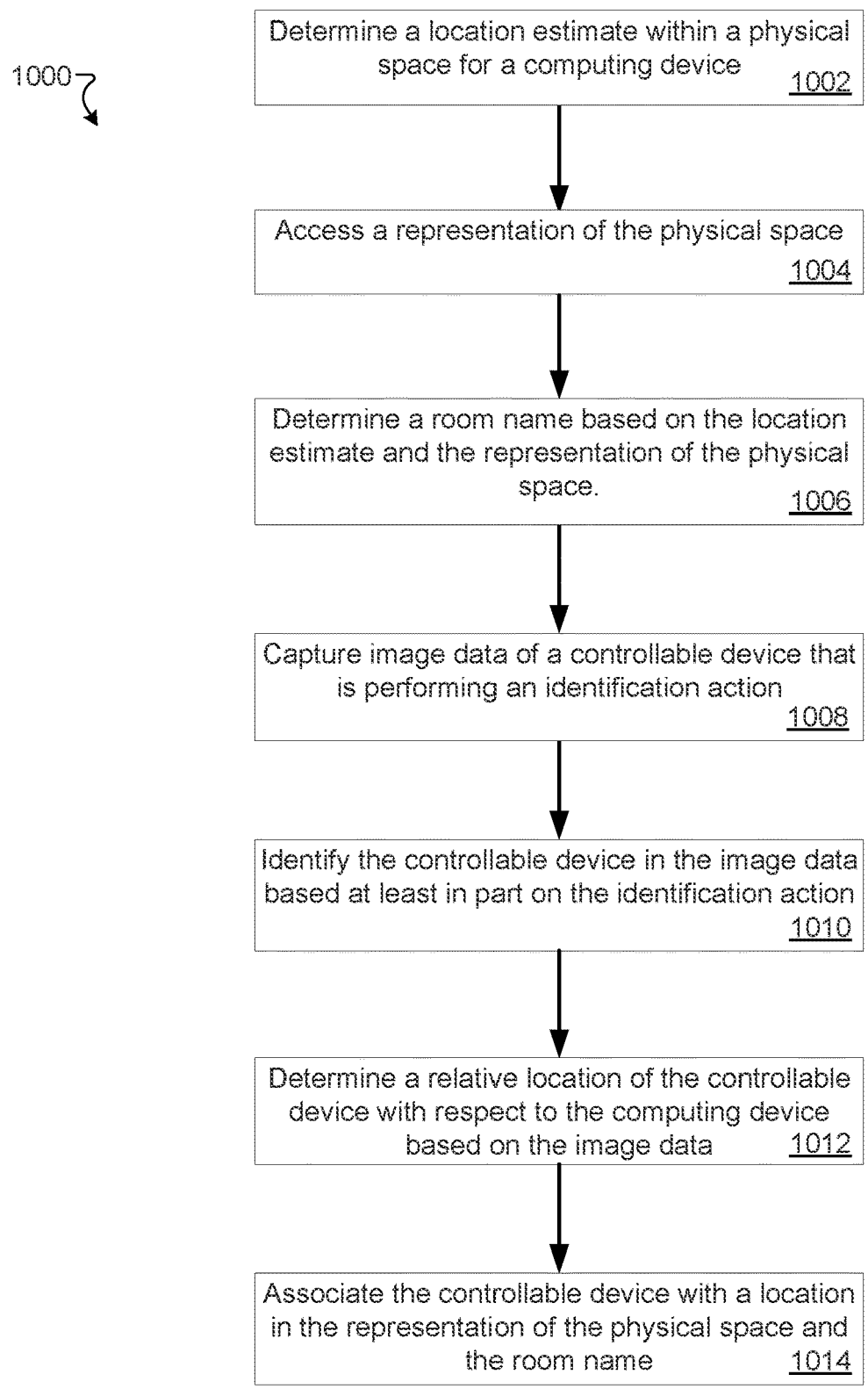
FIG. 10 is a diagram of an example method of associating a controllable device with a location in a physical space and a room name, in accordance with implementations described herein.

FIG. 10 is a diagram of an example method 1000 of associating a controllable device with a location in a physical space and a room name. For example, the method 1000 may be performed by the device configuration engine 130 of the computing device 102 to configure a controllable device in a physical space. In some implementations, the method 1000 is performed in response to the user initiating a configuration process for a controllable device.

At operation 1002, a location estimate within a physical space is determined for a computing device. At operation 1004, a representation of the physical space may be accessed. The representation may be stored in the location data 140 or retrieved from the location data source 106. In some implementations, the representation is retrieved at least in part based on the location estimate. The representation may be two dimensional or three dimensional.

At operation 1006, a room name is determined based on the location estimate and the representation of the physical space. In some implementations, portions of the representation of the physical space may be labeled or otherwise associated with room names. The room names may have been previously provided by a user. In some implementations, the room names are generated based on object recognition of image data collected within the portion of the physical space associated with the room.

At operation 1008, image data of the controllable device performing an identification action is captured. At operation 1010, the controllable device is identified within the image data based at least in part on the identification action.

At operation 1012, a relative location of the controllable device with respect to the computing device is determined based on the image data. In some implementations, the size of the controllable device or a portion of the controllable device within the image data is used to infer the distance to the controllable device. Additionally, the viewing angle of the controllable device may be inferred from the location, orientation, and/or skew of the controllable device within the image data. In some implementations, the location of the controllable device is determined with respect to the representation of the physical space based on the location of the controllable device relative to features extracted from the image data.

At operation 1014, the controllable device is associated with a location in the representation of the physical space and the room name. In some implementations, associating the controllable device with a location in the physical representation includes storing a data record that includes an identifier of the controllable device and the location information. In some implementations, the identity of the controllable device may then be received based on the room name or the location information.

Figure 11:
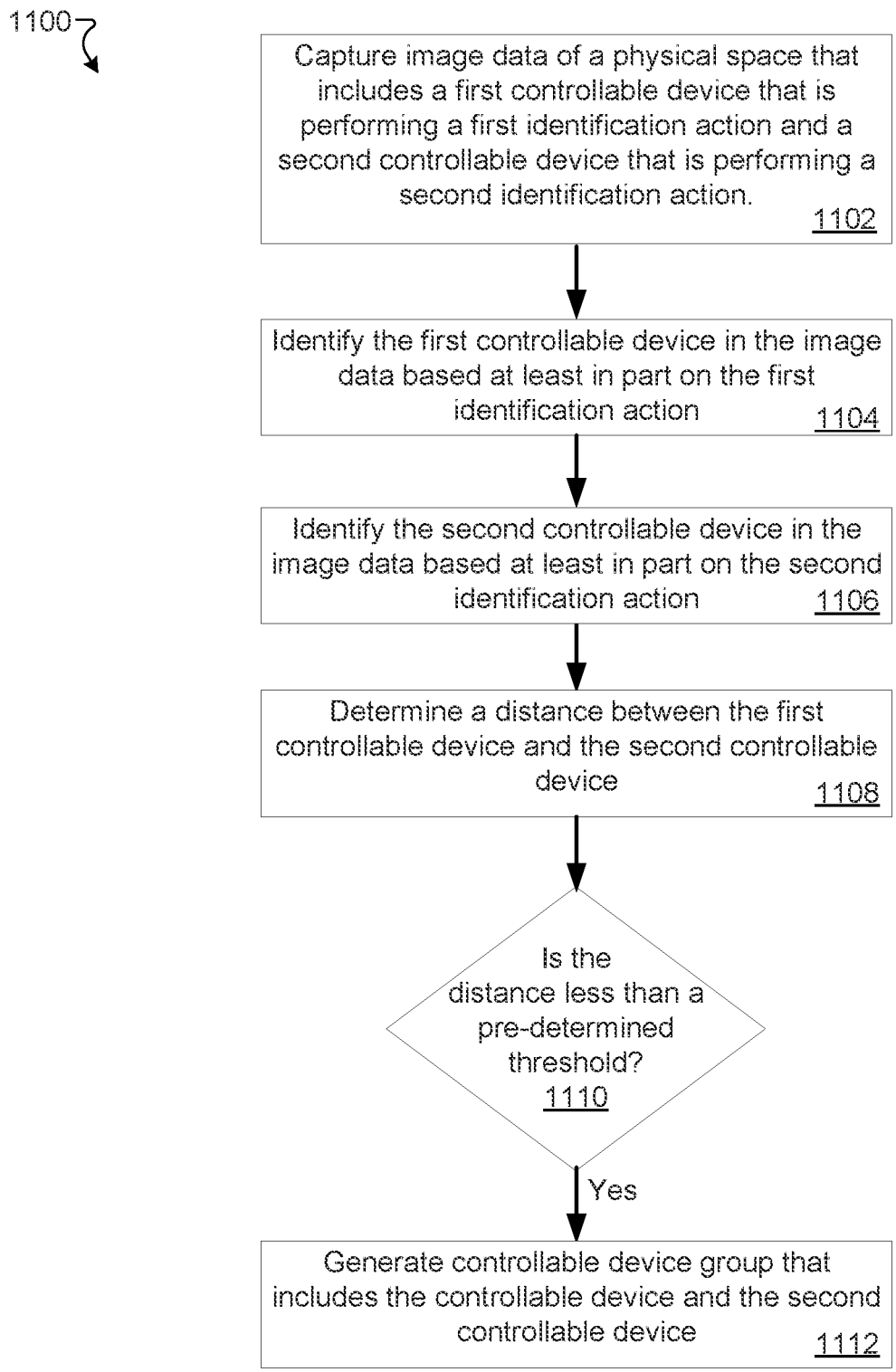
FIG. 11 is a diagram of an example method of grouping controllable devices that are located in a physical space, in accordance with implementations described herein.

FIG. 11 is a diagram of an example method 1100 of grouping controllable devices that are located in a physical space. For example, the method 1100 may be performed by the device configuration engine 130 of the computing device 102 to configure multiple controllable devices. In some implementations, the method 1100 is performed in response to the user initiating a configuration process for a controllable device.

At operation 1102, image data of a physical space that includes a first controllable device that is performing a first identification action and a second controllable device that is performing a second identification action is captured. The image data may include a single image that captures both the first controllable device and the second controllable device. The image data may include video data, having multiple frames that pans through the physical space to capture the first controllable device and the second controllable device. The first and second controllable device need not be captured in the same frame.

At operation 1104, the first controllable device is identified in the image data based at least in part on the first identification action. At operation 1106, the second controllable device is identified in the image data based at least in part on the second identification action.

At operation 1108, a distance between the first controllable device and the second controllable device is determined. In some implementations, the distance is determined based on determining locations of both the first controllable device and the second controllable device with respect to either the computing device or a representation of the physical space. Once the locations are determined with respect to a common landmark or frame of reference, the locations of the first controllable device and the second controllable device may be determined with respect to each other. In some implementations, the distance between the first controllable device and the second controllable device is determined directly.

At operation 1110, it is determined whether the distance is less than a predetermined threshold distance. If so, the method 1100 may proceed to operation 1112, where a controllable device group is generated that includes the first controllable device and the second controllable device. Generating the controllable device group may allow for a single command from a user perspective to be issued to both controllable devices. In some implementations, only specific types of controllable devices are grouped together.

As described above, in some implementations, responsive to determining that the distance between controllable devices is less than the threshold distance, the controllable devices are grouped together. Although two controllable devices were grouped together in this example, more than two controllable devices may be grouped together. Additionally, in some implementations, a new controllable device that is within a threshold distance of at least one controllable device that is in an existing controllable device group may be added to that controllable device group.

Figure 12:
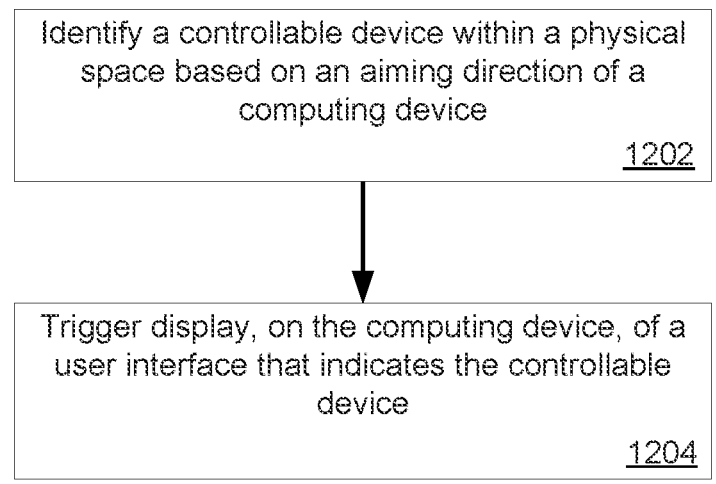
FIG. 12 is a diagram of an example method of displaying a user interface that indicates a controllable device at which a computing device is aimed, in accordance with implementations described herein.

FIG. 12 is a diagram of an example method 1200 of displaying a user interface that indicates a controllable device at which a computing device is aimed, or pointed, or oriented. In the event that the computing device is an HMD, a gaze direction (e.g., a head gaze direction) may identify the controllable device at which the computing device is aimed or pointed. For example, the method 1200 may be performed by the user interface engine 142 of the computing device 102. In some implementations, the method 1200 may be performed in response to detecting movement of the computing device 102. For example, after a user moves the computing device 102, the method 1200 may be performed to determine whether the user is aiming the computing device 102 at (or near) a controllable device and to determine whether to display an indication of the controllable device. In some implementations, the method 1200 may be performed while a lock screen is being displayed by the computing device 102 (e.g., while the computing device is in a locked state) or when the computing device 102 is executing one or more applications that are causing content or user interface elements to be displayed by the display device 116.

At operation 1202, a controllable device within a physical space is identified based on an aiming direction of a computing device. For example, the controllable device may be identified based on image data captured by the camera assembly 152. The image data may be captured by a lens of the camera assembly 152 that is directed in the direction that the computing device 102 is aimed. For example, if the computing device 102 is a handheld device that is held like a remote control such that an edge of the computing device 102 (e.g., a top edge that is disposed above the top of the display device 116 when the computing device is used in a portrait mode) is pointed at a controllable device to aim at the controllable device, the camera assembly 152 may capture image data using a lens disposed in the top edge. Similarly, if the computing device is, for example, an HMD worn on the head of the user, and is aimed at, or pointed in the direction of a controllable device (i.e., a head gaze is directed at the controllable device to be identified and/or selected for interaction), the camera assembly 152 of the computing device 102 (in the form of the HMD) may capture image data using a lens thereof, disposed in the HMD. The image data may be processed to identify controllable devices contained within the field of view of the camera assembly 152. The image data may also be used to determine (or refine) a location estimate and/or to determine an orientation of the computing device 102 by comparing features extracted from the image data to known features of the physical space (e.g., as may be retrieved from the location data 140 or the location data source 106). Using the location estimate and the determined orientation, a controllable device may be determined based on known locations of controllable devices within the physical space. In some implementations, a controllable device is identified based on the computing device 102 being aimed directly at the controllable device (e.g., when an imaginary ray extending from the computing device 102 in the aiming direction intersects the controllable device). In some implementations, a controllable device is identified based on the computing device 102 being aimed approximately at the controllable device. For example, the controllable device may be identified when the computing device 102 is aimed within a threshold distance or angular offset of the controllable device.

At operation 1204, a user interface may be displayed by the computing device, for example, on, or by, a display device of the computing device, that indicates the identified controllable device is triggered. In some implementations, display of an indication is triggered only if one or more specific aiming criteria are met. For example, the aiming criterion may be based on the angular offset between the aiming direction of the computing device 102 and the position of the controllable device. The aiming criteria may also be based on the orientation of the computing device 102. For example, the indication may be shown when the computing device 102 is in a horizontal or approximately horizontal orientation.

Figure 13:
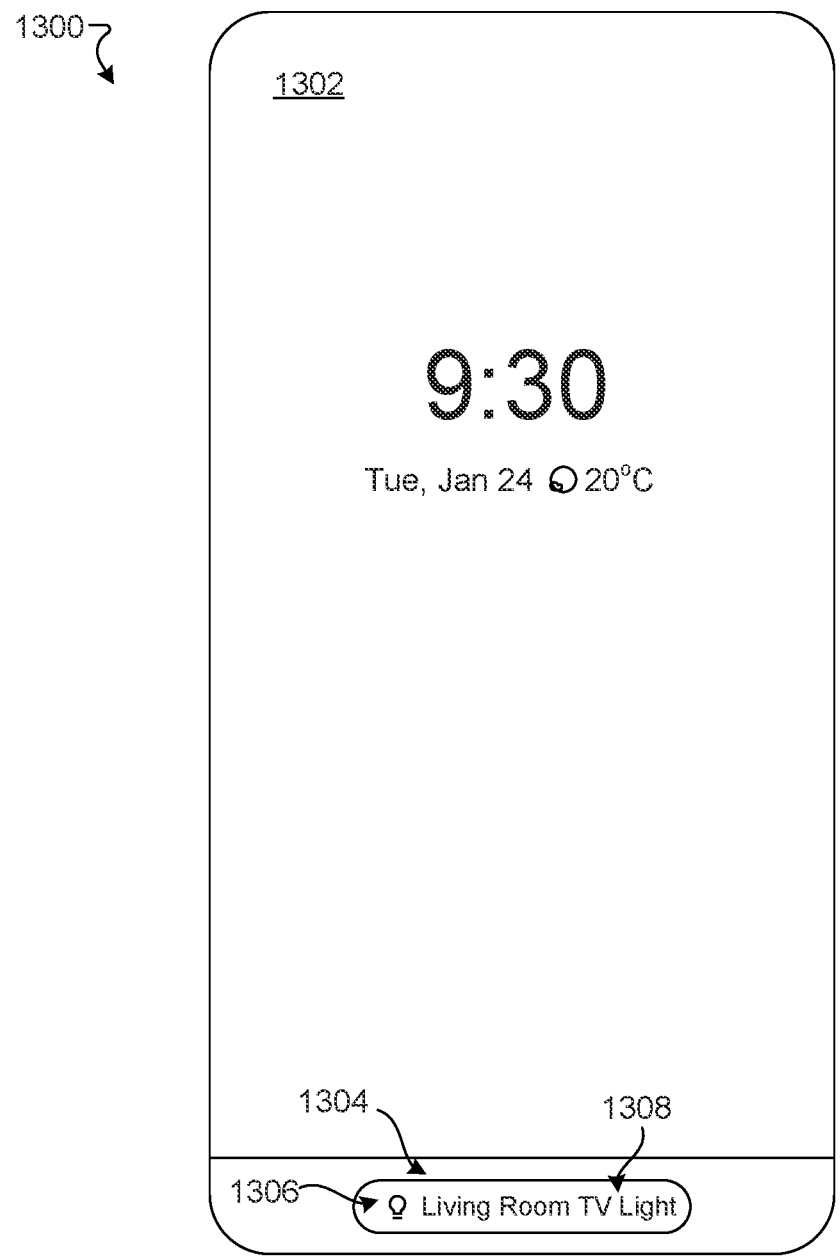
FIG. 13 includes an example user interface screen with an indicator of a controllable device, in accordance with implementations described herein.

FIG. 13 includes an example user interface screen 1300 that includes background content 1302 and an indicator 1304 of a controllable device. The background content 1302 may be a lock screen, a home screen, or content or a user interface generated by one or more other applications. In this example, the indicator 1304 includes an icon 1306 and a description 1308. The icon 1306 may, for example, indicate a controllable device type of the identified controllable device, and the description may include a name of the controllable device. In some implementations, the indicator 1304 may be a user-actuatable control that when actuated (e.g., tapped, long touched, etc.), may cause a command to be transmitted to the controllable device or may cause additional user interface elements to be displayed. For example, the additional user interface elements may display properties of the controllable device, such as a volume level, brightness level, temperature setting, or channel selection. In some implementations, when the indicator 1304 is displayed the computing device 102 may be configured to receive certain user inputs to control or interact with the controllable device. For example, the computing device 102 may interpret a touch of the screen and a tilt of the computing device 102 as a user input to transmit a command to increase or decrease a setting value on the controllable device.

Figure 14:
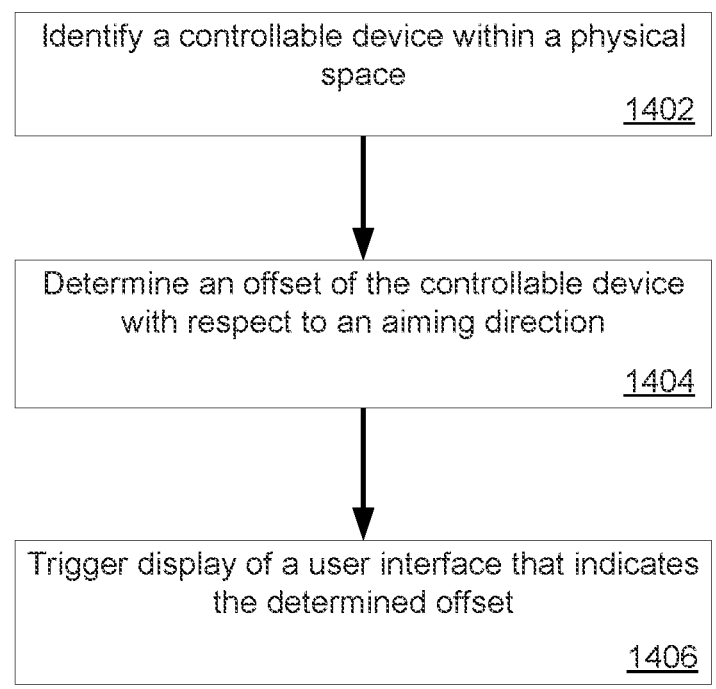
FIG. 14 is a diagram of an example method of displaying a user interface that indicates a relative location of a controllable device, in accordance with implementations described herein.

FIG. 14 is a diagram of an example method 1400 of displaying a user interface that indicates a relative location of a controllable device. For example, the method 1400 may be performed by the user interface engine 142 of the computing device 102. In some implementations, the method 1400 may be performed in response to detecting movement of the computing device 102. For example, after a user moves the computing device 102, the method 1400 may be performed to indicate the relative locations of one or more controllable devices with respect to the computing device or the orientation of the computing device. In some implementations, the method 1400 may be performed while a lock screen is being displayed by the computing device 102 (e.g., while the computing device is in a locked state) or when the computing device 102 is executing one or more applications that are causing content or user interface elements to be displayed by the display device 116.

At operation 1402, a controllable device is identified within a physical space. The controllable device may be identified based on the aiming direction of the computing device 102, based on proximity to the computing device 102, or based on being in the same portion of a physical space (e.g., room) as the computing device 102. As described in more detail elsewhere herein, the location of the computing device 102 may be estimated using various technologies. The estimated location may then be used to identify controllable devices that are known to be in the physical space. Controllable devices may also be identified based on image data captured with a camera assembly of the computing device 102.

At operation 1404 an offset of the controllable device is determined with respect to an aiming direction of the computing device. The offset may correspond to the angular difference between the aiming direction of the computing device 102 and the direction the computing device 102 would need to be oriented to aim at the controllable device. In some implementation, the offset is determined based on image data captured by the camera assembly 152 of the computing device 102. The offset may then be determined by identifying the position of the controllable device within the image field and calculating a change in orientation of the computing device 102 required to position the controllable device within the center of the image field. The offset may also be calculated based on determining an orientation of the computing device 102 using the IMU 154 and a location of the computing device 102. The offset can then be calculated by comparing the determined orientation to an orientation required to aim at the controllable device from the location of the computing device 102. In some implementations, offsets are determined for multiple controllable devices.

At operation 1406, display of a user interface that indicates the determined offset is triggered. The user interface may, for example, guide a user to locate a controllable device within a physical space and aiming at the controllable device. When multiple controllable devices are identified, the user interface may help the user aim at specific one of the user devices to, for example, control or interact with that user device. Non-limiting examples of user interfaces that indicate an offset are illustrated in FIGS. 15A-15C.

Figure 15:
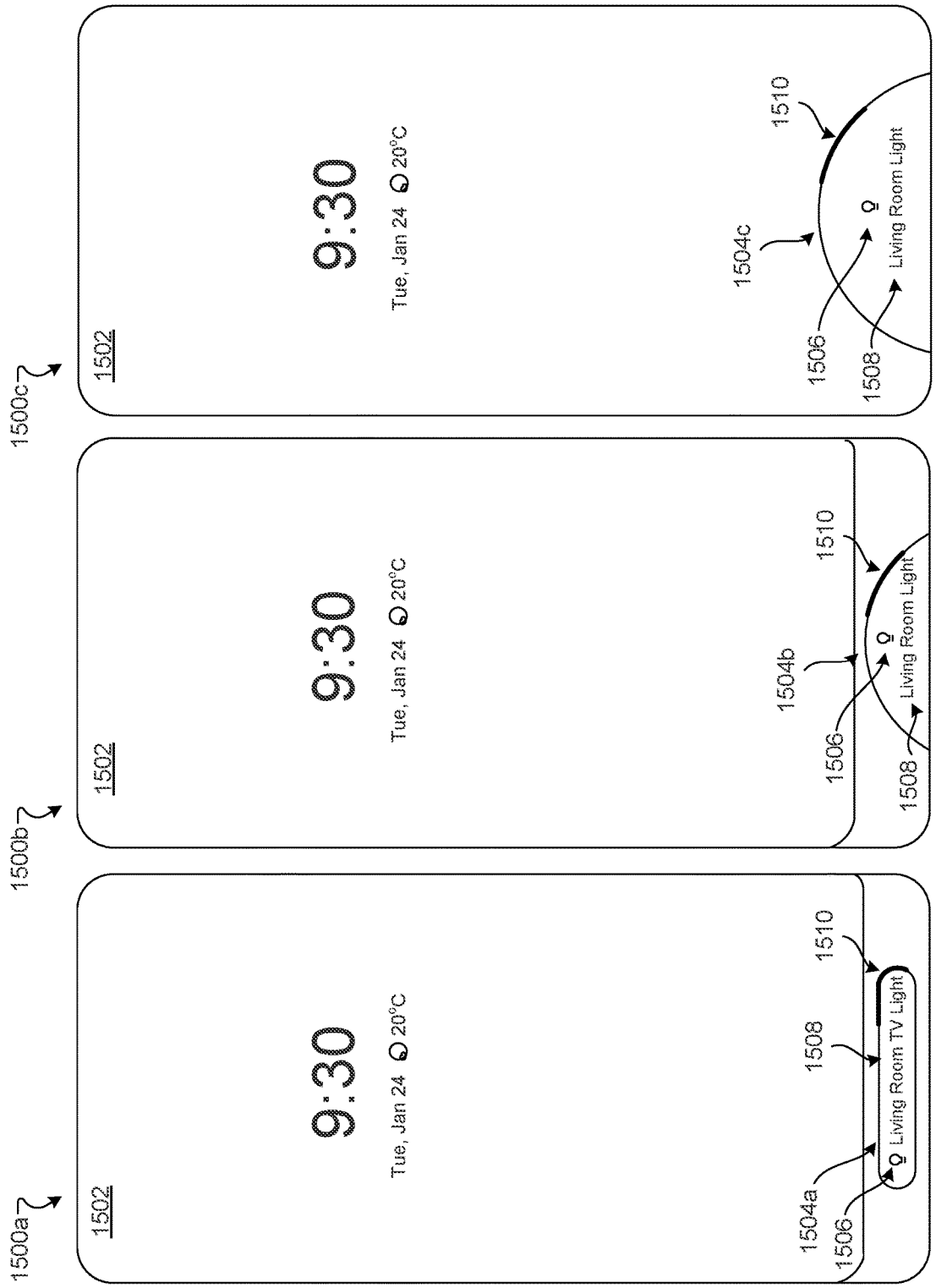
FIGS. 15A-15C include examples of user interfaces that indicate an offset to a controllable device, in accordance with implementations described herein.

FIG. 15A includes an example user interface screen 1500a that includes background content 1502 and an indicator 1504a of an offset to a controllable device. The background content 1502 may be similar to the previously described background content 1302. Additionally, the indicator 1504a may be similar to the indicator 1304 except that the indicator 1504a also includes a directional indicator 1510. In some implementations, the indicator 1510 indicates a position of the controllable device with respect to the computing device. For example, the indicator 1510 may indicate a direction to orient the computing device 102 to aim at the controllable device. In this example, the indicator 1504a also includes an icon 1506 and a description 1508, which may be similar to the previously described icon 1306 and description 1308.

Here, the indicator 1504a has a rectangular shape with rounded corners. Other shapes are possible too, such as an oval, rectangle, circle, square, or other shapes. The directional indicator 1510 may then be placed on an edge of the indicator 1504a at a position determined based on the directional offset. For example, the position for the directional indicator 1510 on the indicator 1504a may be determined by mapping the angle of the directional offset to the controllable device to a position on the perimeter of the indicator 1510. For example, the center of the top edge of the indicator may correspond to an angular offset of 0 (e.g., the computing device 102 is aimed directly at the controllable device) and each point along the perimeter may correspond to a different angular offset (e.g., as though the directional indicator 1510 were positioned at an intersection point of a ray were projected out from a midpoint of the indicator 1504a at the determined angle). In some implementations, only the horizontal component of the directional offset is used to determine the position for the indicator 1510. In some implementations, as a user moves the phone, the location of the directional indicator 1510 moves along the perimeter of the indicator 1510.

FIG. 15B includes an example user interface screen 1500b that is similar to the user interface screen 1500a. The user interface screen 1500b includes an indicator 1504b. In some implementations, the indicator 1504b may be a substantially semi-circular indicator having a semi-circular shape, an arcuate indicator having a substantially arcuate shape, and the like. In this implementation, the directional indicator 1510 is positioned on the perimeter of the indicator 1504b based on the angle of the directional offset. If the controllable device is behind the computing device 102 (e.g., the angle of the directional offset is more than 90 degrees in either direction), the directional indicator 1510 may not be shown. In some implementations, the directional indicator 1510 is still shown when the controllable device is behind the computing device 102 but may be modified to indicate that controllable device is behind the user (e.g., the color may change, the size may change, the shape may change to, for example, an arrow).

FIG. 15C includes an example user interface screen 1500c that is similar to the user interface screen 1500b. In this example, the user interface screen 1500c includes an indicator 1504c that has a semi-circular shape, or an arcuate shape, and is larger than the indicator 1504b shown in FIG. 15B.

Figure 16:
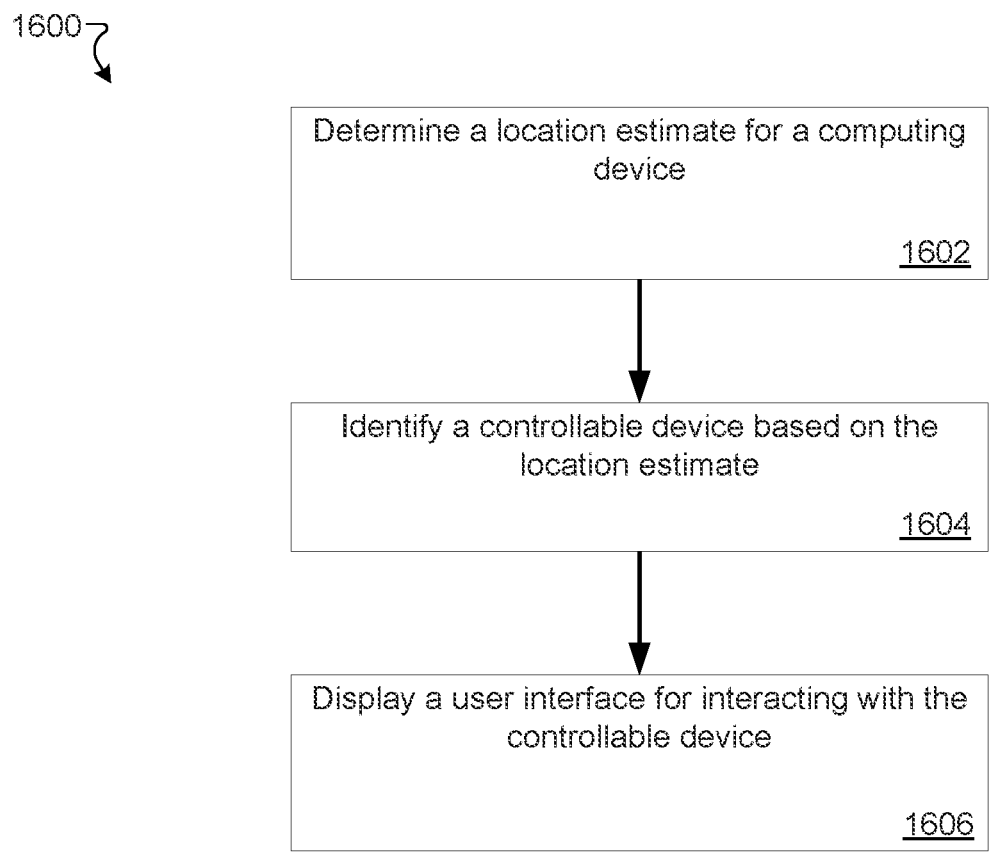
FIG. 16 is a diagram of an example method of displaying a user interface for interacting with a controllable device based on a relative location of the controllable device, in accordance with implementations described herein.

FIG. 16 is a diagram of an example method 1600 of displaying a user interface for interacting with a controllable device based on a relative location of the controllable device. For example, the method 1600 may be performed by the user interface engine 142 of the computing device 102. In some implementations, the method 1600 may be performed in response to detecting movement of the computing device 102. For example, after a user moves the computing device 102, the method 1600 may be performed to provide a user interface for controlling a controllable device that the computing device is aimed at or near. In some implementations, the method 1600 may be performed while a lock screen is being displayed by the computing device 102 (e.g., while the computing device is in a locked state) or when the computing device 102 is executing one or more applications that are causing content or user interface elements to be displayed by the display device 116.

At operation 1602, a location estimate for the computing device 102 is determined. At operation 1604, a controllable device is identified based on the location estimate. The controllable device may be identified based on determining that the controllable device is within a threshold distance of the computing device 102 or is within the same room (or other portion of a physical space) as the computing device 102. In some implementations, the controllable device is identified based on the computing device 102 being aimed at and/or near the controllable device. The controllable device may be identified based on image data captured from a (e.g., top facing) camera of the camera assembly 152 that is directed at the controllable device when the computing device 102 is aimed at the controllable device. The controllable device may also be identified based on data about its position that is stored in representation of the physical space.

At operation 1606, a user interface for interacting with the controllable device is displayed. For example, the user interface engine 142 may trigger display of the user interface by the display device 116. The user interface may provide information about the controllable device, such as user-adjustable settings or measurements from the controllable device. Non-limiting examples of user-adjustable settings include a brightness level, a volume level, a channel, and a desired temperature. Non-limiting examples of measurements include temperature and humidity measurements.

In some implementations, the user interface is displayed based on determining a relative direction of the controllable device with respect to the computing device. For example, the location of the controllable device and the computing device 102 may be determined. An aiming direction of the computing device 102 may also be determined. For example, based on the determined locations and the aiming direction, a relative direction to the controllable device may be determined. The relative direction may be a change in orientation required to aim directly at the controllable device. In some implementations, the user interface is displayed based on the relative direction meeting specific criteria, such as having a horizontal offset angle that is less than a predetermined magnitude (e.g., the computing device is aimed within 5, 10, 15, 30 or another number of degrees of the controllable device). Optionally, an icon representing the controllable device is selected when triggering display of the user interface, and a position for displaying the selected icon on the user interface may be determined based on the relative location of the controllable device with respect to the computing device. Further, the icon may be caused to be displayed at the determined position on the user interface.

Figure 17:
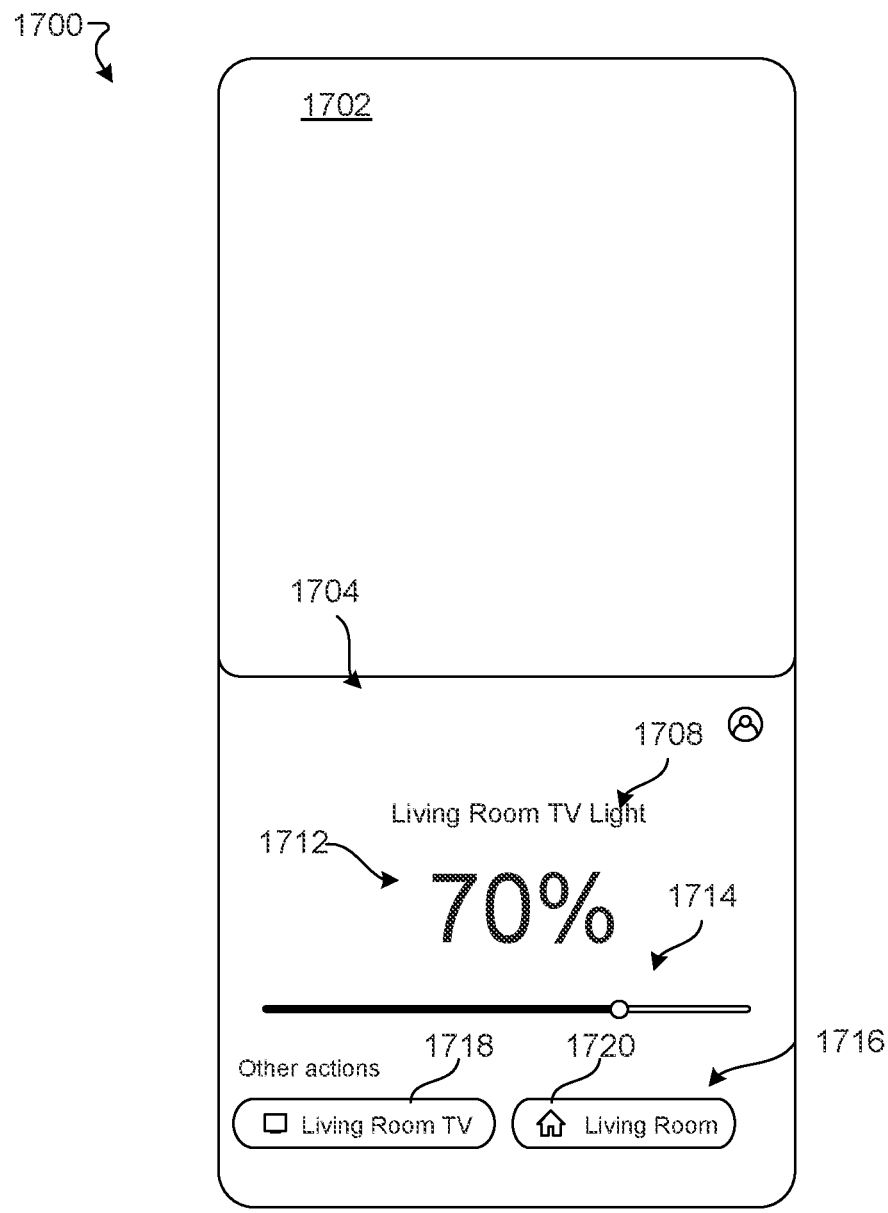
FIG. 17 includes an example user interface screen that includes an indicator of a controllable device with controls for interacting with the controllable device, in accordance with implementations described herein.

FIG. 17 includes an example user interface screen 1700 that includes background content 1702 and an indicator 1704 of a controllable device with controls for interacting with the controllable device. The background content 1702 may be similar to the previously described background content 1302. The indicator 1704 may be similar to the indicator 1304 except that the indicator 1704 also includes a controllable device setting display element 1712, a controllable device setting adjustment element 1714, and a controllable device selection menu element 1716. In this example, the indicator 1704 also includes a description 1708, which may be similar to the previously described description 1308.

The controllable device setting display element 1712 is a user interface element that displays a user-adjustable setting for a controllable device. In this example, the controllable device setting display element 1712 is displaying a brightness setting for a light. The controllable device setting adjustment element 1714 is a user-actuatable element that a user can actuate a controllable device setting. In this example, the controllable device setting adjustment element 1714 is a slider that a user can touch and drag to the left or right to adjust the brightness level.

The controllable device selection menu element 1716 is a user interface element a user can use to select a different controllable element for interaction. For example, the controllable device selection menu element 1716 may include menu options, such as the menu options 1718 and 1720 shown here, associated with other controllable devices that are in proximity to the computing device 102 or that the computing device 102 is aiming at or near. In some implementations, when a user touches or otherwise actuates one of the menu options, the indicator 1704 may be updated for interaction with the controllable devices associated with the actuated menu option.

Figure 18:
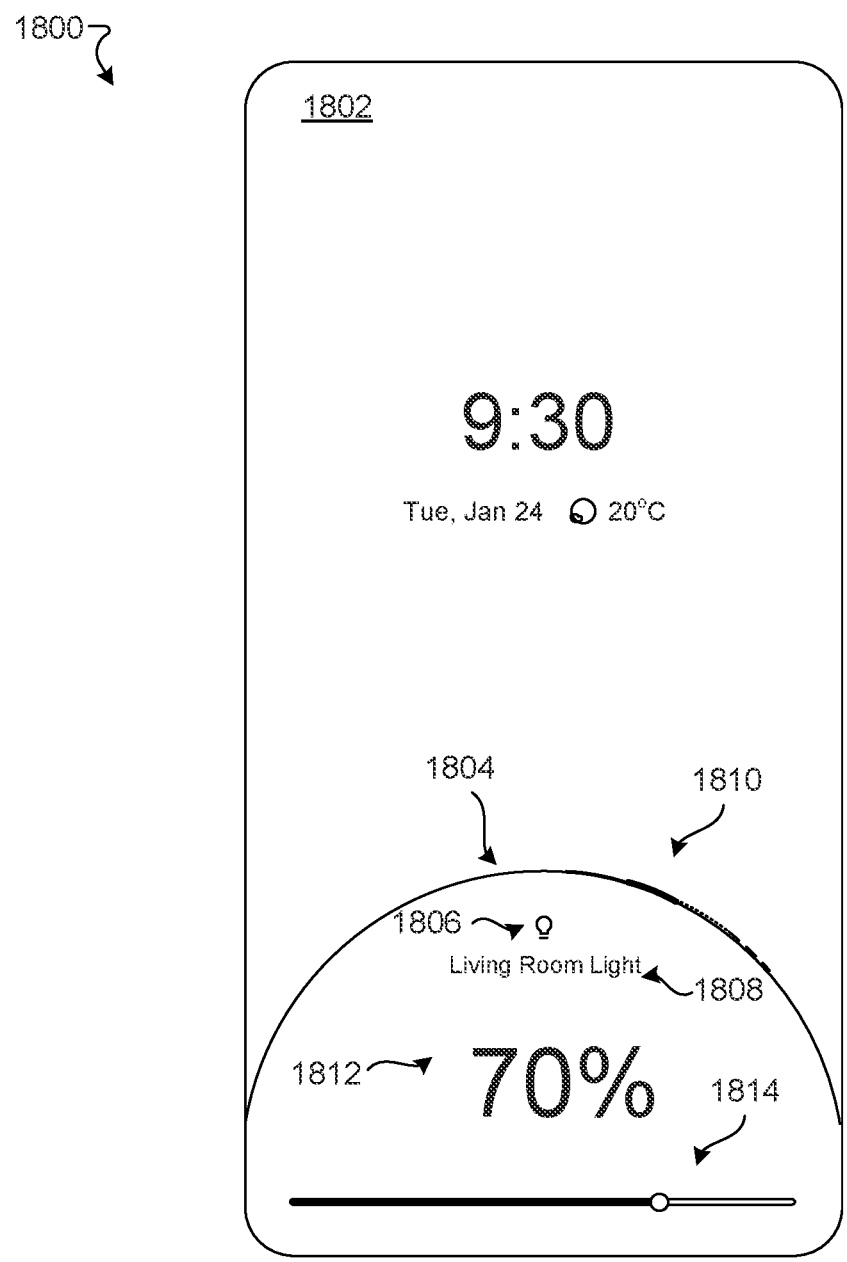
FIG. 18 includes an example user interface screen that includes an indicator of a controllable device with controls for interacting with the controllable device, in accordance with implementations described herein.

FIG. 18 includes an example user interface screen 1800 that includes background content 1802 and an indicator 1804 of a controllable device with controls for interacting with the controllable device. The background content 1802 may be similar to the previously described background content 1302. The indicator 1804 may be similar to the indicator 1704 except that the indicator 1804 includes a directional indicator 1810 and does not include a controllable device selection menu element (although some implementations do). Here, the indicator 1804 includes an icon 1806 and a description 1808, which may be similar to the previously described icon 1306 and description 1308. The indicator 1804 also includes a controllable device setting display element 1812 and a controllable device setting adjustment element 1814, which may be similar to the previously described controllable device setting display element 1712 and controllable device setting adjustment element 1714. The directional indicator 1810 may be similar to the previously described directional indicator 1510.

Figure 19A:
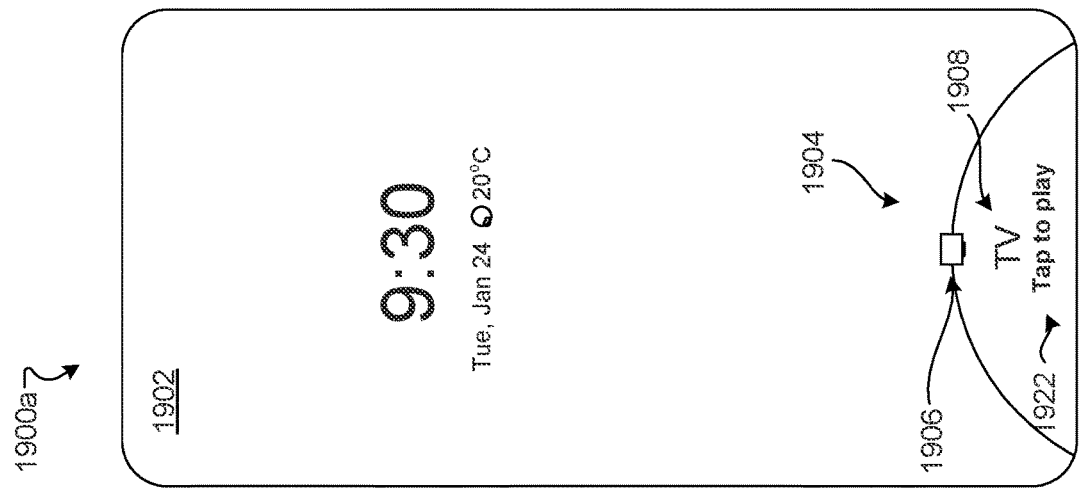
FIGS. 19A-19C include example user interface screens for interacting with a controllable device, in accordance with implementations described herein.
Figure 19B:
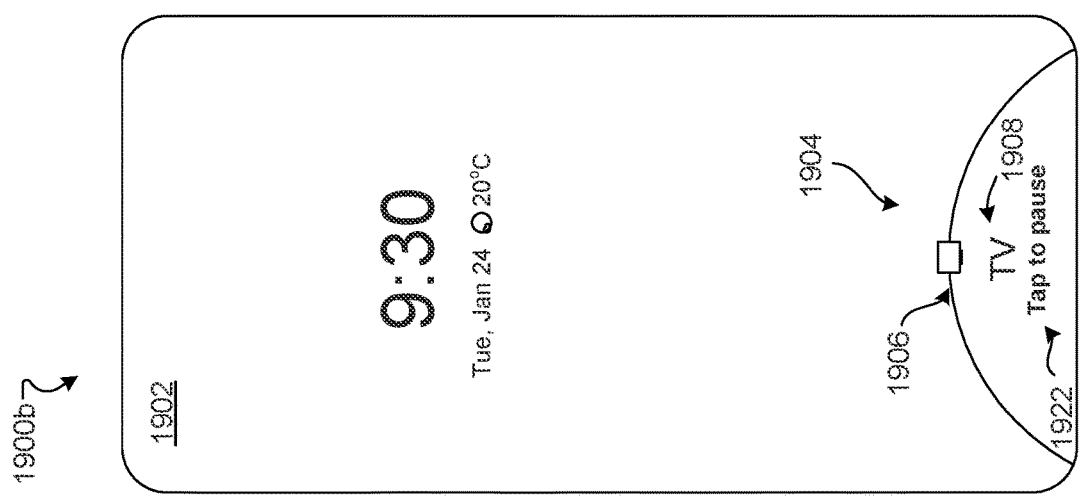
Figure 19C:
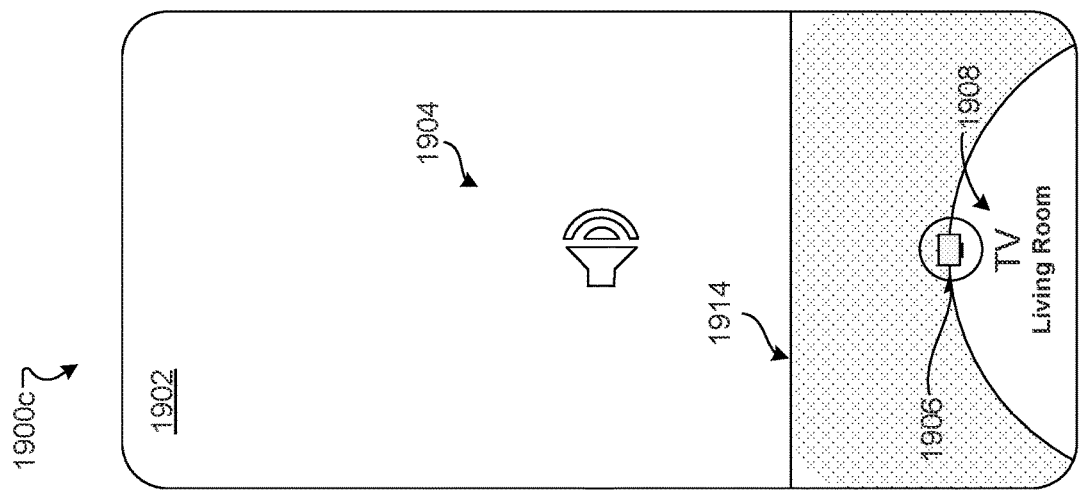

FIGS. 19A-19C include example user interface screens for interacting with a controllable device. In the examples of FIGS. 19A-19C, the controllable device is a television. FIG. 19A includes an example user interface screen 1900a, which includes that background content 1902 and indicator 1904. The background content 1902 may be similar to the previously described background content 1302. The indicator 1904 includes an icon 1906, a description 1908, and an instructional text 1922. The icon 1906 and a description 1908 may be similar to the previously described icon 1306 and description 1308. The instructional text 1922 provides instructions to a user about how to use the user interface screen 1900a to interact with the controllable device. The instructional text 1922 may be generated by a current state or setting of the controllable device. For example, in FIG. 19A, the instructional text 1922 says to "Tap to Play" based on determining that the controllable device is currently paused or stopped. In this example, if the user taps on the indicator 1904, the computing device 102 will transmit a play command to the controllable device.

FIG. 19B includes a user interface screen 1900b that is similar to the user interface screen 1900a shown in FIG. 19A. However, in FIG. 19B, the instructional text 1922 now says "Tap to Pause" based on the computing device 102 determining that the controllable device is currently in a play state. FIG. 19C includes a user interface screen 1900c that is also similar to the user interface screen 1900a shown in FIG. 19A. However, in FIG. 19C, the indicator 1904 is configured to adjust the volume of the controllable device. The user interface screen 1900c may, for example, be displayed based on a user long pressing (e.g., touching and holding the screen of the computing device 102). The user interface screen 1900c includes a controllable device setting adjustment element 1914. The controllable device setting adjustment element 1914 may be similar to the previously described controllable device setting adjustment element 1714 except that commands to increase or decrease volume are transmitted in response to a user swiping up or down on the screen. In this example, the controllable device setting adjustment element 1914 also includes a shaded region to indicate the current volume setting.

Figure 20A:
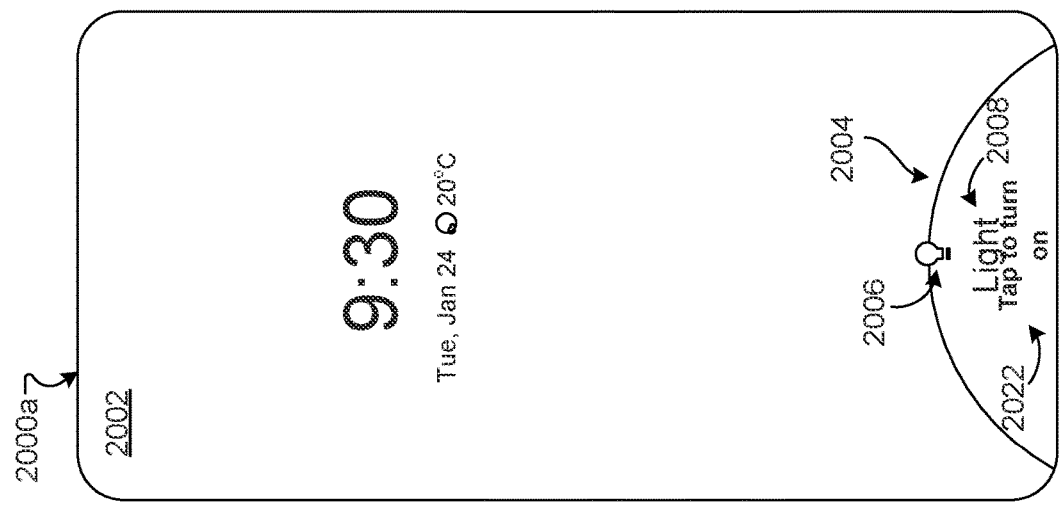
FIGS. 20A-20C include example user interface screens for interacting with a controllable device, in accordance with implementations described herein.
Figure 20B:
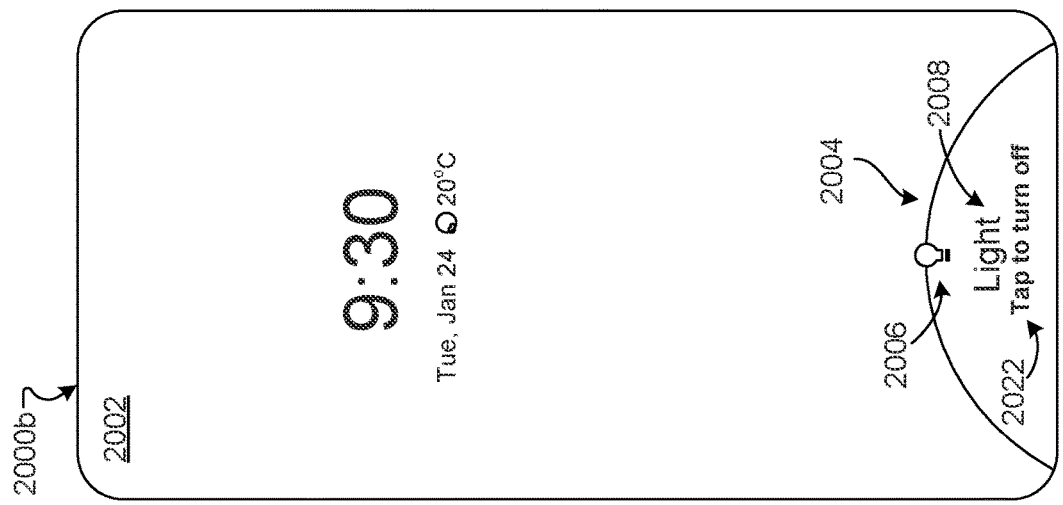
Figure 20C:
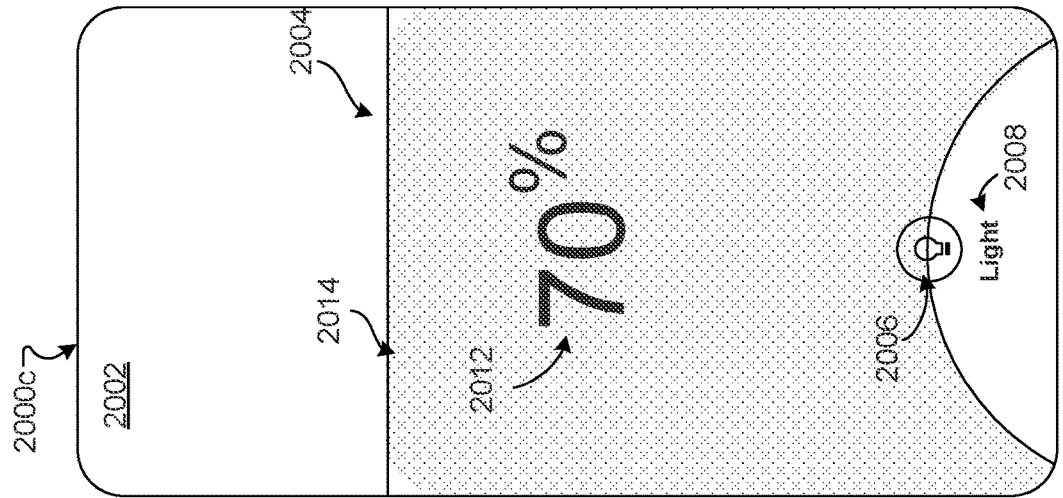

FIGS. 20A-20C include example user interface screens for interacting with a controllable device. These FIGS. 20A-C are very similar to FIGS. 19A-19C, except in the examples of FIGS. 20A-20C, the controllable device is a light. FIG. 20A includes an example user interface screen 2000a, which includes that background content 2002 and indicator 2004. The background content 2002 may be similar to the previously described background content 1302. The indicator 2004 includes an icon 2006, a description 2008, and an instructional text 2022. The icon 2006 and a description 2008 may be similar to the previously described icon 1306 and description 1308. The instructional text 2022 provides instructions to a user about how to use the user interface screen 2000a to interact with the controllable device. The instructional text 2022 may be generated by a current state or setting of the controllable device. For example, in FIG. 20A, the instructional text 2022 says to "Tap to turn on" based on determining that the controllable device is in an off state. In this example, if the user taps on the indicator 2004, the computing device 102 will transmit a turn on command to the controllable device.

FIG. 20B includes a user interface screen 2000b that is similar to the user interface screen 2000a shown in FIG. 20A. However, in FIG. 20B, the instructional text 2022 now says "Tap to turn off" based on the computing device 102 determining that the controllable device is currently in an on state. FIG. 20C includes a user interface screen 2000c that is also similar to the user interface screen 2000a shown in FIG. 20A. However, in FIG. 20C, the indicator 2004 is configured to adjust the brightness of the controllable device. The user interface screen 2000c may, for example, be displayed based on a user long pressing (e.g., touching and holding the screen of the computing device 102). The user interface screen 2000c includes a controllable device setting display element 2012 and a controllable device setting adjustment element 2014. The controllable device setting display element 2012 may be similar to the previously described controllable device setting display element 1712. The controllable device setting adjustment element 2014 may be similar to the previously described controllable device setting adjustment element 1714 except that commands to increase or decrease brightness are transmitted in response to a user swiping up or down on the screen. In this example, the controllable device setting adjustment element 2014 also includes a shaded region to indicate the current brightness setting of the controllable device.

Figure 21:
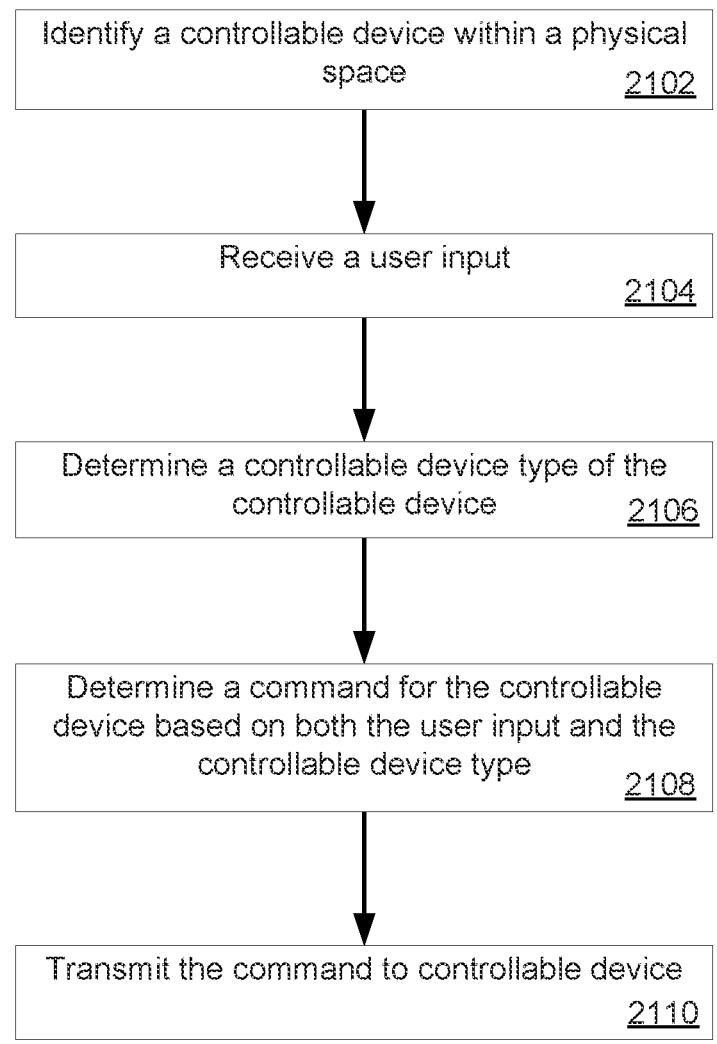
FIG. 21 is a diagram of an example method of transmitting commands to a controllable device, in accordance with implementations described herein.

FIG. 21 is a diagram of an example method 2100 of transmitting commands to a controllable device. For example, the method 2100 may be performed by the device control engine 136 of the computing device 102. In some implementations, the method 2100 may be performed to transmit commands to a controllable device at which the user is aiming the computing device 102. In some implementations, the method 2100 may be performed while a lock screen is being displayed by the computing device 102 (e.g., while the computing device is in a locked state) or when the computing device 102 is executing one or more applications that are causing content or user interface elements to be displayed by the display device 116.

At operation 2102, a controllable device is identified within a physical space. As described previously, the controllable device may be identified based on proximity to the computing device 102 or based on the computing device 102 being aimed at the controllable device. In some implementations, the user interface engine 142 generates a user interface to indicate the identified controllable device.

At operation 2104, a user input is received. Many different types of user inputs may be received. Some non-limiting examples of user inputs include touch commands on a touch sensitive screen of the computing device 102 (including taps, double taps, touch and holds, drags or swipes), gestures made on or near the screen of the computing device, movements of the computing device 102 (including shakes, tilts, or rotations of the computing device 102), actuation of physical components of the computing device 102 (such as pressing a button or squeezing the computing device 102), and spoken commands.

At operation 2106, a controllable device type of the controllable device is determined. The controllable device type may be determined based on image data captured by the camera assembly of the computing device 102. The controllable device type may also be retrieved from a representation of the physical space or other data that identified controllable devices.

At operation 2108, a command for the controllable device is determined based on the user input and the controllable device type. In some implementations, the command is also determined based on a current state of the computing device. For example, a touch and drag user input may be determined to be an increase volume command for a television controllable device and the touch and drag user input may be determined to be an increase brightness command for a light controllable device. At operation 2110, the command is transmitted to the controllable device.

Figure 22:
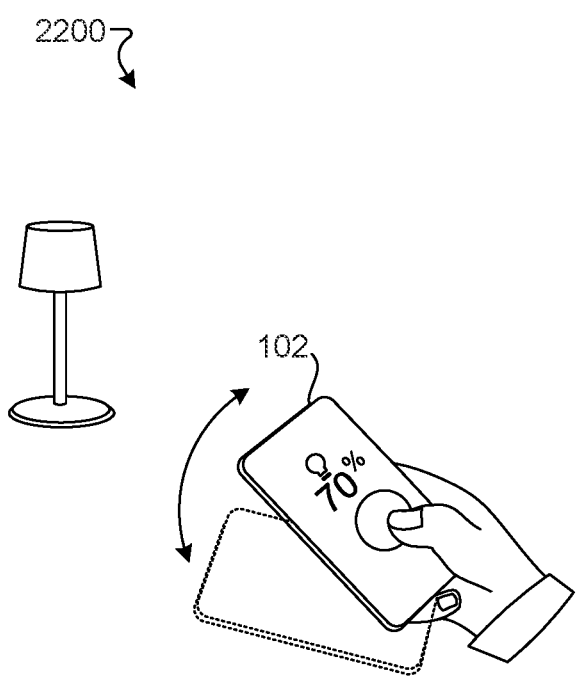
FIG. 22 is an illustration of a user using the computing device of FIG. 1 to interact with and control a light controllable device, in accordance with implementations described herein.

FIG. 22 is an illustration 2200 of a user using the computing device 102 to interact with and control a controllable device in the form of a light. In this example, the computing device 102 has identified the controllable device based on the user aiming, or pointing, the computing device 102 at the controllable device. The computing device 102 is displaying a user interface that includes the current brightness value for the light controllable device. In this example, the user is touching a user-actuatable element on the screen of the computing device 102 and tilting the computing device 102 up and down to transmit commands to adjust the brightness of the light controllable device.

Figure 23B:
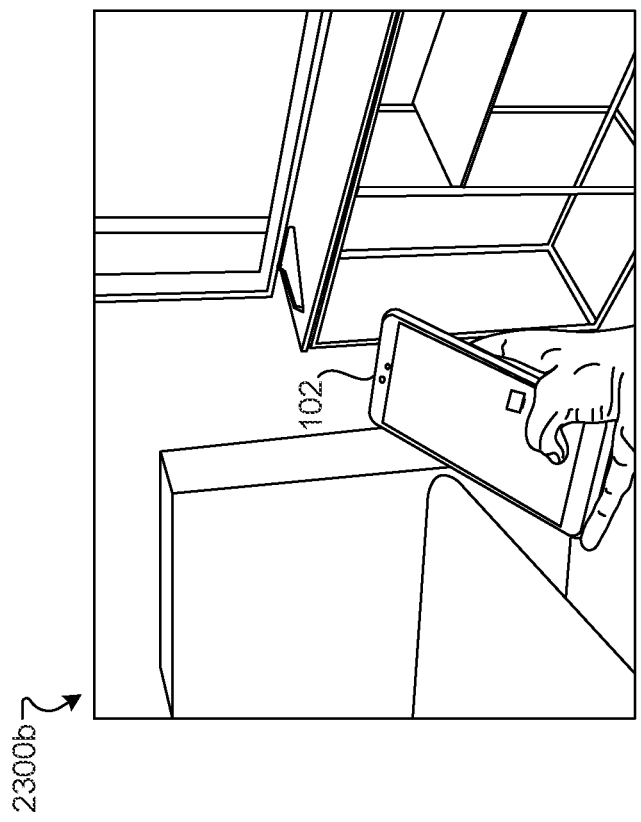
FIGS. 23A and 23B illustrate a user using an example of the computing device of FIG. 1 to interact with a television controllable device, in accordance with implementations described herein.
Figure 23A:
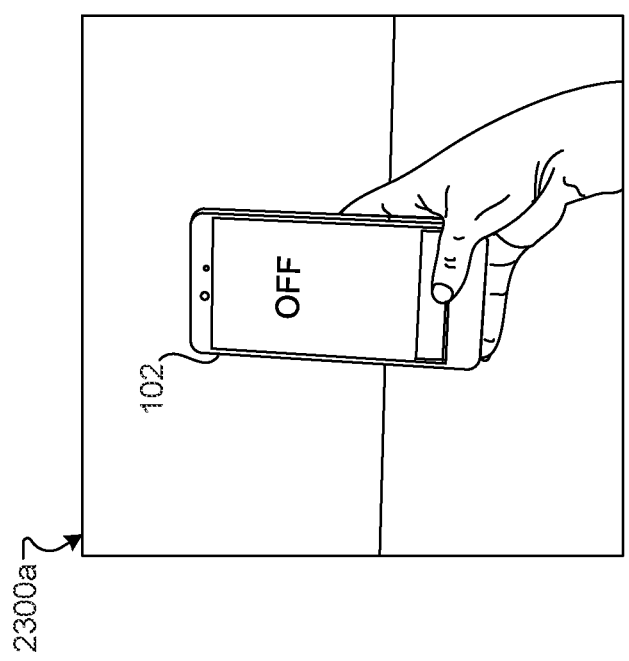

FIGS. 23A and 23B illustrate a user using the computing device 102 to interact with a television controllable device. FIG. 23A includes an illustration 2300a, which includes the computing device 102 showing the current status of the television controllable device. In this example, the controllable device is in an off state as indicated on the screen of the computing device 102. In this example, the user may provide a user input to send a toggle on command to the controllable device. FIG. 23B includes an illustration 2300b in which the television controllable device is now in an on state. The user interface on the computing device 102 includes an icon to show the relative location of the controllable device with respect to the aiming direction of the computing device 102. Here, the user is swiping up on the screen of the computing device 102 to cause the computing device 102 to transmit a volume increase command to the television controllable device.

Figure 24B:
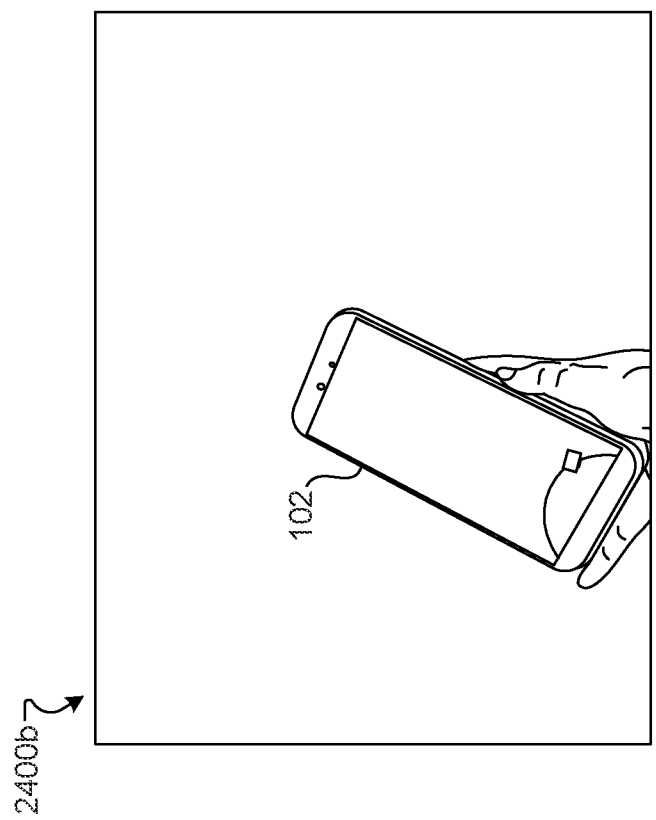
FIGS. 24A and 24B illustrate a user using an example of the computing device of FIG. 1 to identify and interact with controllable devices in a physical space, in accordance with implementations described herein.
Figure 24A:
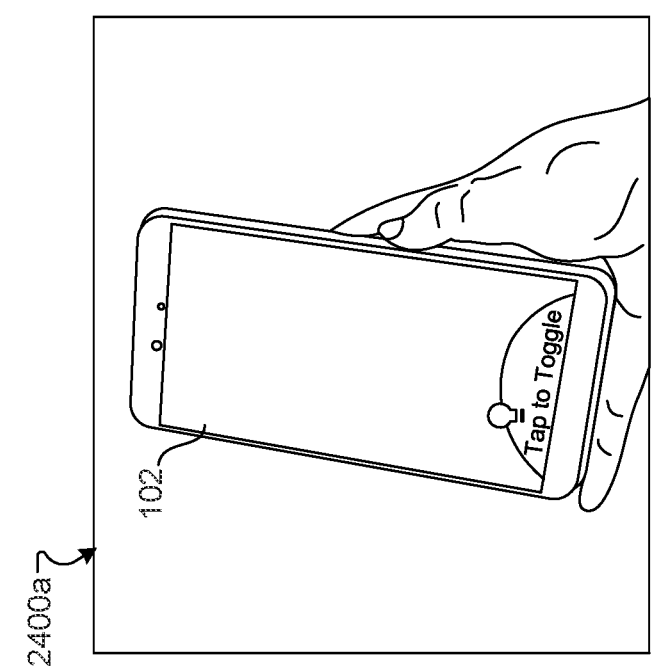

FIGS. 24A and 24B illustrate a user using the computing device 102 to identify and interact with controllable devices in a physical space. FIG. 24A includes an illustration 2400a, which includes the computing device 102 provides an indication of the direction offset to a light controllable device. FIG. 24A also shows the instructional text "Tap to Toggle" indicating that the user interface displayed on the computing device 102 is configured to receive user input to transmit toggle commands to the controllable device. FIG. 24B includes an illustration 2400b in which the computing device 102 has been rotated to aim in a different direction as compared to the computing device 102 in FIG. 24A. The user interface on the computing device 102 includes an icon to show the relative location of a television controllable device with respect to the aiming direction of the computing device 102.

Figure 25:
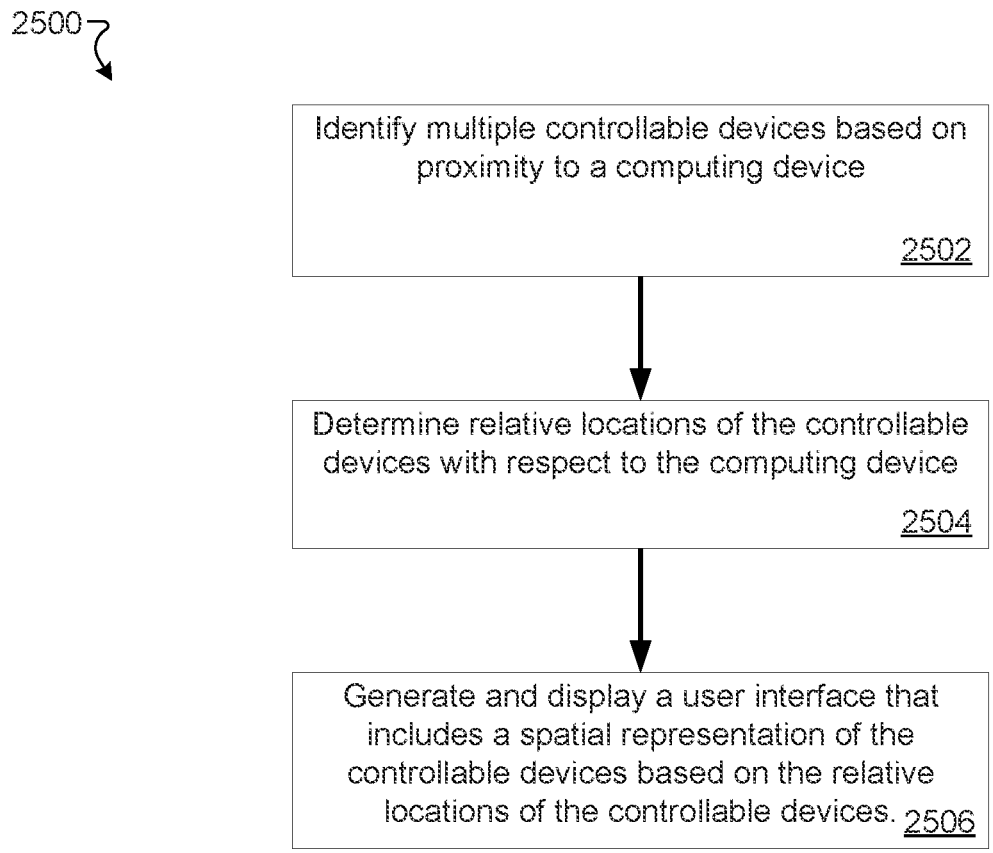
FIG. 25 is a diagram of an example method of identifying multiple controllable devices and displaying a user interface to represent the locations of the multiple controllable devices, in accordance with implementations described herein.

FIG. 25 is a diagram of an example method 2500 of identifying multiple controllable devices and displaying a user interface to represent the locations of the multiple controllable devices. For example, the method 2100 may be performed by the user interface engine 142 of the computing device 102. In some implementations, the method 2500 may be performed in response to detecting movement of the computing device 102. For example, after a user moves the computing device 102, the method 2500 may be performed to provide a user interface that shows updated locations of multiple controllable devices and, in at least some implementations, allows for controlling at least one of the controllable devices that the computing device is aimed at or near. In some implementations, the method 2500 may be performed while a lock screen is being displayed by the computing device 102 (e.g., while the computing device is in a locked state) or when the computing device 102 is executing one or more applications that are causing content or user interface elements to be displayed by the display device 116.

At operation 2502, multiple controllable devices are identified based on proximity to the computing device 102. In some implementations, the proximity is determined based on a threshold distance. In some implementations, the proximity is determined based on being located in the same room as the computing device 102. The controllable devices may also be identified based on an aiming direction of the computing device 102.

At operation 2504, relative locations of the controllable devices with respect to the computing device 102 are determined. The relative locations may, for example, include an angular offset from the aiming direction of the computing device 102.

At operation 2506, a user interface that includes a spatial representation of the controllable devices based on the relative locations is generated and displayed. For example, each of the controllable devices may be represented by an icon placed on the perimeter of a shape included in the user interface (or at another position on the user interface). The icons (in general, at least one icon) may be placed at a location determined based on the angular offset associated with the relative locations of the controllable device. The positions of the icons may correspond to the direction the computing device would need to be turned to in order to aim directly at the associated computing devices.

Figure 26C:
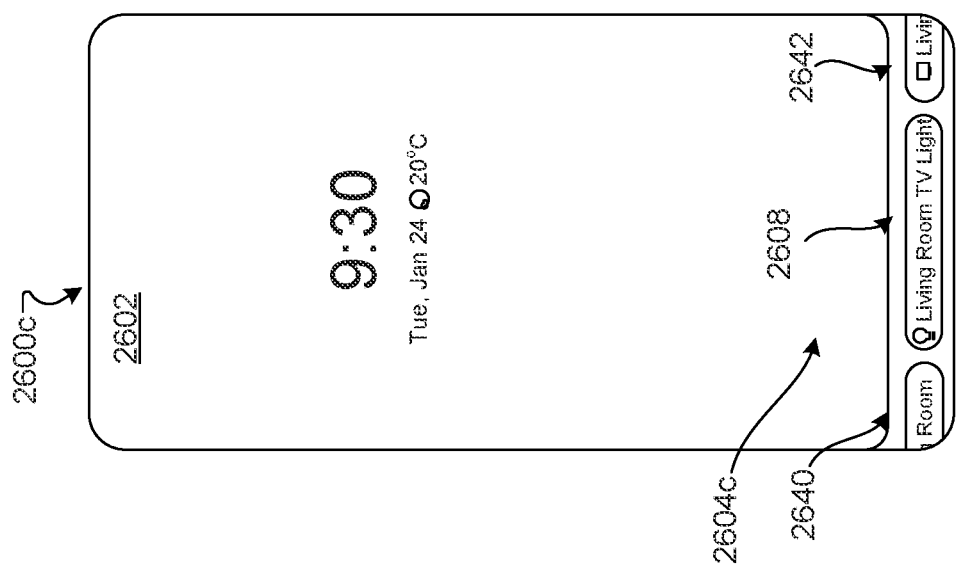
FIGS. 26A-26C include example user interface screens for displaying the relative locations of multiple controllable devices, in accordance with implementations described herein.
Figure 26B:
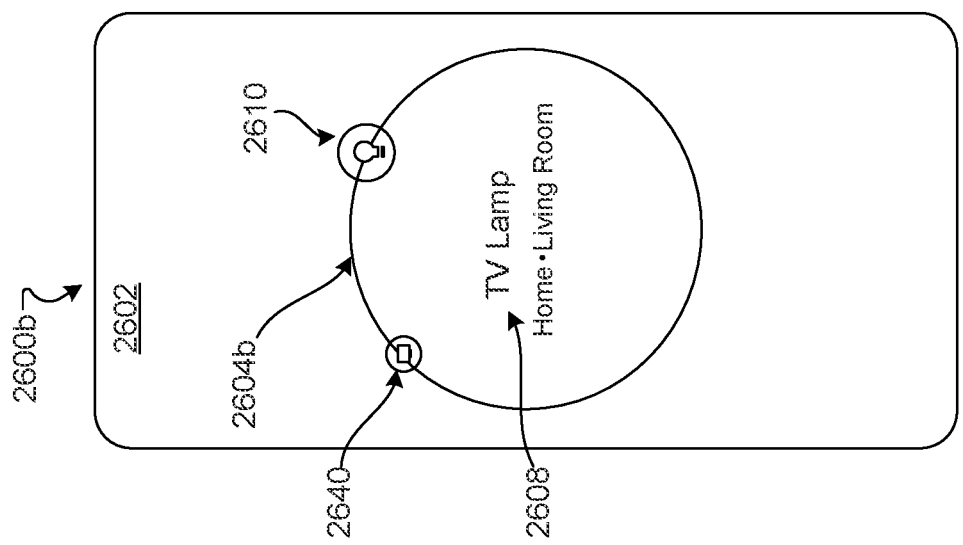
Figure 26A:
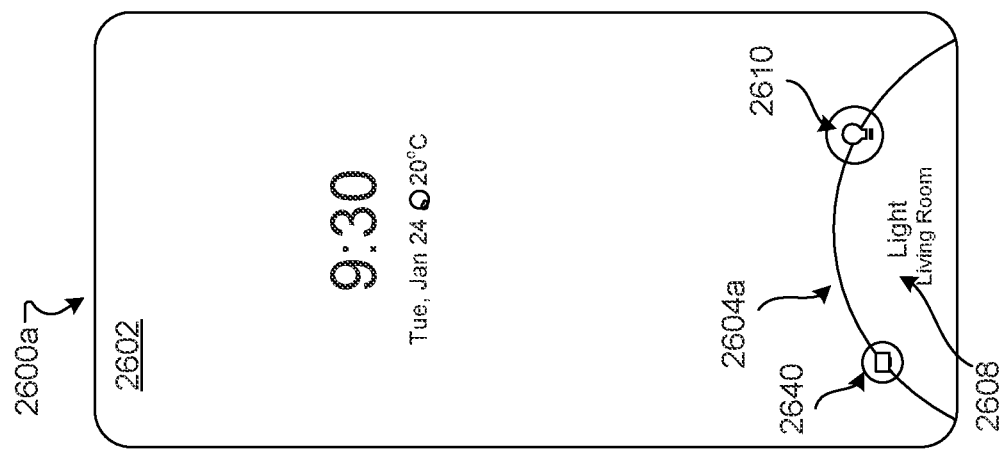

FIGS. 26A-26C include example user interface screens for displaying the relative locations of multiple controllable devices. These FIGS. 26A-26C are similar to FIGS. 15A-15C, except that in the examples of FIGS. 26A-26C, the relative locations of multiple controllable devices is indicated. FIG. 26A includes an example user interface screen 2600a, which includes that background content 2602 and indicator 2604a. The background content 2602 may be similar to the previously described background content 1302. The indicator 2604a includes a description 2608, a directional indicator 2610, and an additional directional indicator 2640. The description 2608 relates to the controllable device that is currently identified for control and interaction. The directional indicator 2610 indicates the relative location of the controllable device that is currently identified for control with respect to the aiming direction of the computing device 102. The additional directional indicator 2640 indicates the relative direction of another controllable device. Although the indicator 2604a has a semicircular shape, or an arcuate shape, disposed at the bottom of the user interface screen 2600a, alternatives are possible. For example, FIG. 26B shows a user interface screen 2600b that is similar to the user interface screen 2600a except that the user interface screen 2600b includes an indicator 2604b that has a circular shape, or an arcuate shape, disposed near the middle of the user interface screen 2600b. FIG. 26C shows a user interface screen 2600c that includes an indicator 2604c. The indicator 2604c includes the description 2608, the additional indicator 2640, and a second additional indicator 2642. In this example, the additional identifier 2640 and the second additional identifier 2642 are not necessarily positioned based on the exact angular offset but are placed at locations that represent the direction the computing device 102 must generally be moved to aim at the associated controllable device.

Figure 27:
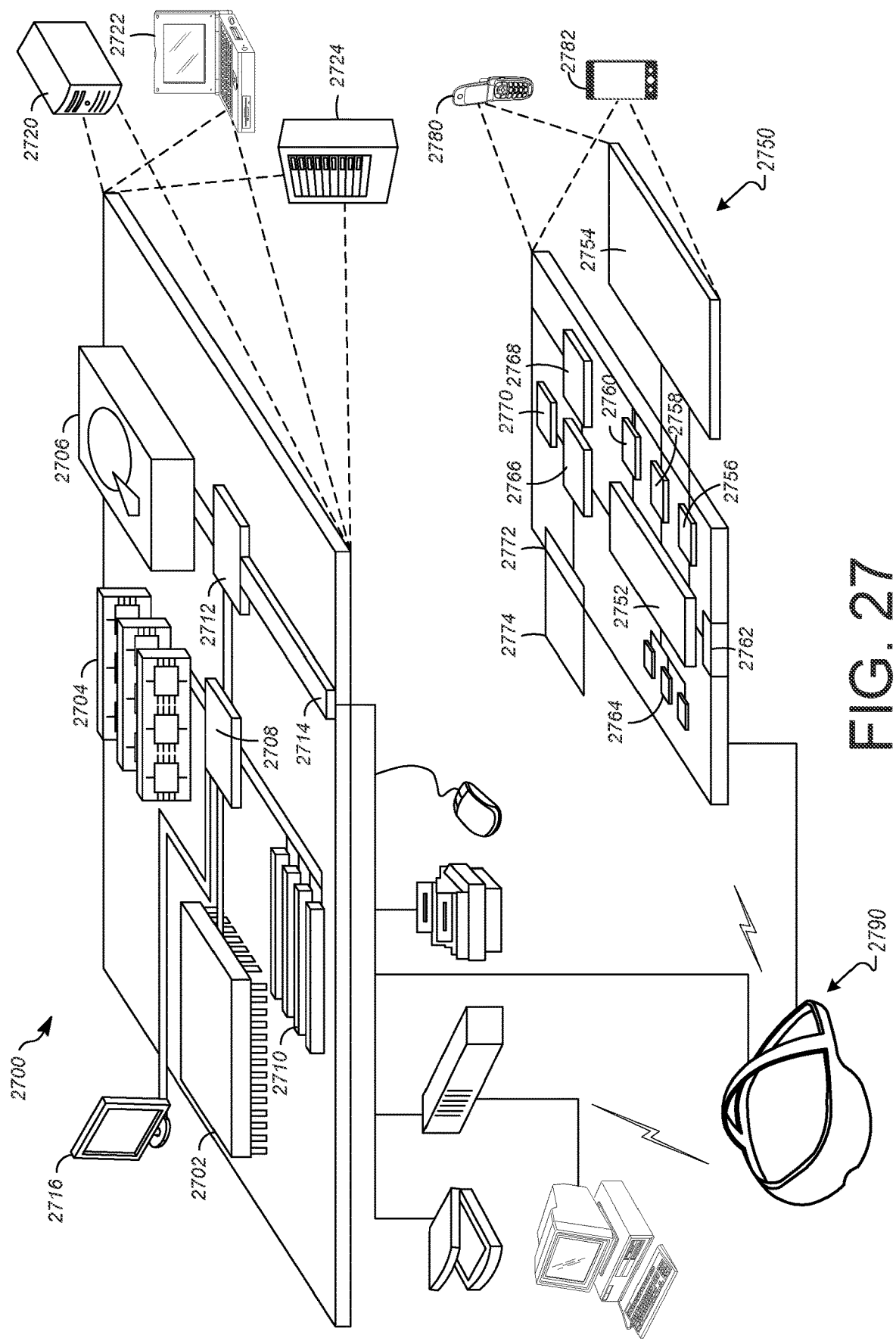
FIG. 27 shows an example of a computer device and a mobile computer device that can be used to implement the techniques described herein.

FIG. 27 shows an example of a computer device 2700 and a mobile computer device 2750, which may be used with the techniques described here. Computing device 2700 includes a processor 2702, memory 2704, a storage device 2706, a high-speed interface 2708 connecting to memory 2704 and high-speed expansion ports 2710, and a low speed interface 2712 connecting to low speed bus 2714 and storage device 2706. Each of the components 2702, 2704, 2706, 2708, 2710, and 2712, are interconnected using various busses, and may be mounted on a common motherboard or in other manners as appropriate. The processor 2702 can process instructions for execution within the computing device 2700, including instructions stored in the memory 2704 or on the storage device 2706 to display graphical information for a GUI on an external input/output device, such as display 2716 coupled to high speed interface 2708. In other implementations, multiple processors and/or multiple buses may be used, as appropriate, along with multiple memories and types of memory. Also, multiple computing devices 2700 may be connected, with each device providing portions of the necessary operations (e.g., as a server bank, a group of blade servers, or a multi-processor system).

The memory 2704 stores information within the computing device 2700. In one implementation, the memory 2704 is a volatile memory unit or units. In another implementation, the memory 2704 is a non-volatile memory unit or units. The memory 2704 may also be another form of computer-readable medium, such as a magnetic or optical disk.

The storage device 2706 is capable of providing mass storage for the computing device 2700. In one implementation, the storage device 2706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2704, the storage device 2706, or memory on processor 2702.

The high speed controller 2708 manages bandwidth-intensive operations for the computing device 2700, while the low speed controller 2712 manages lower bandwidth-intensive operations. Such allocation of functions is exemplary only. In one implementation, the high-speed controller 2708 is coupled to memory 2704, display 2716 (e.g., through a graphics processor or accelerator), and to high-speed expansion ports 2710, which may accept various expansion cards (not shown). In the implementation, low-speed controller 2712 is coupled to storage device 2706 and low-speed expansion port 2714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2700 may be implemented in a number of different forms, as shown in the figure. For example, it may be implemented as a standard server 2720, or multiple times in a group of such servers. It may also be implemented as part of a rack server system 2724. In addition, it may be implemented in a personal computer such as a laptop computer 2722. Alternatively, components from computing device 2700 may be combined with other components in a mobile device (not shown), such as device 2750. Each of such devices may contain one or more of computing device 2700, 2750, and an entire system may be made up of multiple computing devices 2700, 2750 communicating with each other.

Computing device 2750 includes a processor 2752, memory 2764, an input/output device such as a display 2754, a communication interface 2766, and a transceiver 2768, among other components. The device 2750 may also be provided with a storage device, such as a microdrive or other device, to provide additional storage. Each of the components 2750, 2752, 2764, 2754, 2766, and 2768, are interconnected using various buses, and several of the components may be mounted on a common motherboard or in other manners as appropriate.

The processor 2752 can execute instructions within the computing device 2750, including instructions stored in the memory 2764. The processor may be implemented as a chipset of chips that include separate and multiple analog and digital processors. The processor may provide, for example, for coordination of the other components of the device 2750, such as control of user interfaces, applications run by device 2750, and wireless communication by device 2750.

Processor 2752 may communicate with a user through control interface 2758 and display interface 2756 coupled to a display 2754. The display 2754 may be, for example, a TFT LCD (Thin-Film-Transistor Liquid Crystal Display) or an OLED (Organic Light Emitting Diode) display, or other appropriate display technology. The display interface 2756 may include appropriate circuitry for driving the display 2754 to present graphical and other information to a user. The control interface 2758 may receive commands from a user and convert them for submission to the processor 2752. In addition, an external interface 2762 may be provided in communication with processor 2752, so as to enable near area communication of device 2750 with other devices.

External interface 2762 may provide, for example, for wired communication in some implementations, or for wireless communication in other implementations, and multiple interfaces may also be used.

The memory 2764 stores information within the computing device 2750. The memory 2764 can be implemented as one or more of a computer-readable medium or media, a volatile memory unit or units, or a non-volatile memory unit or units. Expansion memory 2774 may also be provided and connected to device 2750 through expansion interface 2772, which may include, for example, a SIMM (Single In-Line Memory Module) card interface. Such expansion memory 2774 may provide extra storage space for device 2750, or may also store applications or other information for device 2750. Specifically, expansion memory 2774 may include instructions to carry out or supplement the processes described above, and may include secure information also. Thus, for example, expansion memory 2774 may be provided as a security module for device 2750, and may be programmed with instructions that permit secure use of device 2750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2764, expansion memory 2774, or memory on processor 2752, that may be received, for example, over transceiver 2768 or external interface 2762.

Device 2750 may communicate wirelessly through communication interface 2766, which may include digital signal processing circuitry where necessary. Communication interface 2766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2768. In addition, short-range communication may occur, such as using a Bluetooth, Wi-Fi, or other such transceiver (not shown). In addition, GPS (Global Positioning System) receiver module 2770 may provide additional navigation- and location-related wireless data to device 2750, which may be used as appropriate by applications running on device 2750.

Device 2750 may also communicate audibly using audio codec 2760, which may receive spoken information from a user and convert it to usable digital information. Audio codec 2760 may likewise generate audible sound for a user, such as through a speaker, e.g., in a handset of device 2750. Such sound may include sound from voice telephone calls, may include recorded sound (e.g., voice messages, music files, etc.) and may also include sound generated by applications operating on device 2750.

The computing device 2750 may be implemented in a number of different forms, as shown in the figure. For example, it may be implemented as a cellular telephone 2780. It may also be implemented as part of a smartphone 2782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 27 can include sensors that interface with an AR headset/HMD device 2790 to generate an augmented environment for viewing inserted content within the physical space. For example, one or more sensors included on a computing device 2750 or other computing device depicted in FIG. 27, can provide input to the AR headset 2790 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 2750 can use the sensors to determine an absolute position and/or a detected rotation of the computing device in the AR space that can then be used as input to the AR space. For example, the computing device 2750 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 2750 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 2750 when the computing device is incorporated into the AR space can cause a particular action to occur in the AR space.

In some implementations, a touchscreen of the computing device 2750 can be rendered as a touchpad in AR space. A user can interact with the touchscreen of the computing device 2750. The interactions are rendered, in AR headset 2790 for example, as movements on the rendered touchpad in the AR space. The rendered movements can control virtual objects in the AR space.

In some implementations, one or more output devices included on the computing device 2750 can provide output and/or feedback to a user of the AR headset 2790 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 2750 may appear as another object in a computer-generated, 3D environment. Interactions by the user with the computing device 2750 (e.g., rotating, shaking, touching a touchscreen, swiping a finger across a touch screen) can be interpreted as interactions with the object in the AR space. In the example of the laser pointer in an AR space, the computing device 2750 appears as a virtual laser pointer in the computer-generated, 3D environment. As the user manipulates the computing device 2750, the user in the AR space sees movement of the laser pointer. The user receives feedback from interactions with the computing device 2750 in the AR environment on the computing device 2750 or on the AR headset 2790. The user's interactions with the computing device may be translated to interactions with a user interface generated in the AR environment for a controllable device.

In some implementations, a computing device 2750 may include a touchscreen. For example, a user can interact with the touchscreen to interact with a user interface for a controllable device. For example, the touchscreen may include user interface elements such as sliders that can control properties of the controllable device.

Computing device 2700 is intended to represent various forms of digital computers and devices, including, but not limited to laptops, desktops, workstations, personal digital assistants, servers, blade servers, mainframes, and other appropriate computers. Computing device 2750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Some examples are provided below:

Example 1: A method comprising: determining a first location estimate for a computing device using a first interior location estimating technique; and determining a second location estimate for the computing device by refining the first location estimate using a second interior location estimating technique, the first interior location estimating technique being different than the second interior location estimating technique.

Example 2: The method of example 1, wherein the first location estimate is associated with a first error bound and the second location estimate is associated with a second error bound, the second error bound being less than the first error bound.

Example 3: The method of example 1, wherein the determining the first location estimate for the computing device using the first interior location estimating technique includes: determining a plurality of round-trip times, wherein each round-trip time of the plurality of times corresponds to a different wireless communication device; and estimating the first location estimate based on the plurality of round-trip times.

Example 4: The method of example 3, wherein the determining the second location estimate for the computing device includes: activating an image sensor of the computing device; triggering capture by the image sensor of image data; and estimating the second location estimate based on the image data and at least one of the first location estimate or the plurality of round-trip times.

Example 5: The method of example 4, wherein estimating the second location estimate includes: extracting features from the image data; and estimating the second location estimate based on the extracted features and at least one of the first location estimate or the plurality of round-trip times.

Example 6: The method of example 5, wherein the image data includes an image of the environment in which the computing device is located, and the estimating the second location estimate includes: identifying at least one object in the image of the environment; and estimating the second location estimate based on the identified object and at least one of the first location estimate or the plurality of round-trip times.

Example 7: The method of example 6, wherein the estimating the second location estimate based on the identified object and at least one of the first location estimate or the plurality of round-trip times: determining a relative location of the at least one object based on the image of the environment; and estimating the second location estimate based on the relative location of the identified object and at least one of the first location estimate or the plurality of round-trip times.

Example 8: The method of example 4, further comprising: capturing orientation data with an inertial motion unit of the computing device; and wherein the estimating the second location estimate includes: estimating the second location estimate based on the image data, the orientation data, and at least one of the first location estimate or the plurality of round-trip times.

Example 9: The method of example 4, wherein the estimating the second location estimate includes using a machine learning model to estimate the second location estimate based on the image data and at least one of the first location estimate or the plurality of round-trip times.

Example 10: The method of example 4, wherein the estimating the second location estimate includes: receiving a representation of a three-dimensional space; identifying a portion of the representation of the three-dimensional space based on the first location estimate; and comparing the image data to the portion of the representation of the three-dimensional space to determine the second location estimate.

Example 11: The method of example 4, wherein the determining the first location estimate for the computing device includes determining the first location estimate while the image sensor is deactivated.

Example 12: The method of example 4, further comprising: receiving a user input after determining the first location estimate; and responsive to the user input, determining the second location estimate.

Example 13: A non-transitory computer-readable storage medium comprising instructions stored thereon that, when executed by at least one processor, are configured to cause a computing system to: determine a plurality of round-trip times, wherein each round-trip time of the plurality of times corresponds to a different wireless communication device; determining a first location estimate based on the plurality of round-trip times; trigger capture of image data; and determining a second location estimate based on the image data and the first location estimate.

Example 14: The non-transitory computer-readable storage medium of example 13, wherein the first location estimate is associated with a first error bound and the second location estimate is associated with a second error bound, the second error bound being less than the first error bound.

Example 15: The non-transitory computer-readable storage medium of example 13, wherein the instructions are further configured to cause the computing system to: extract features from the image data; and determine the second location estimate based on the extracted features and at least one of the first location estimate or the plurality of round-trip times.

Example 16: The non-transitory computer-readable storage medium of example 15, wherein the instructions configured to cause the computing system to determine the second location estimate include instructions configured to cause the computing system to: retrieve a portion of a representation of a physical space based on the first location estimate; and use the portion of the representation of the physical space and the features extracted from the image data to determine the second location estimate.

Example 17: The non-transitory computer-readable storage medium of example 13, wherein the instructions are further configured to cause the computing system to: select a controllable device based on the second location estimate; and transmit a command to the controllable device.

Example 18: A computing device comprising: at least one processor; and memory storing instructions that, when executed by the at least one processor, cause the computing device to: determine a first location estimate for a computing device using a first interior location estimating technique; and determine a second location estimate for the computing device by refining the first location estimate using a second interior location estimating technique, the second interior location estimating technique using at least one type of input signal that is different than input signals used by the first interior location estimating techniques.

Example 19: The computing device of example 18, wherein the instructions to determine the first location estimate include instructions that cause the computing device to: determine a plurality of round-trip times, wherein each round-trip time of the plurality of times corresponds to a different wireless communication device; and determine the first location estimate based on the plurality of round-trip times.

Example 20: The computing device of example 18, wherein the instructions further cause the computing device to: select a controllable device based on the second location estimate; and transmit a command to the controllable device.

Example 21: A method comprising: determining a location estimate for a computing device; capturing image data, by the computing device, of a physical space that includes a controllable device performing an identification action; identifying the controllable device in the image data based at least in part on the identification action; and determining configuration information for the controllable device, the configuration information being based at least in part on the location estimate for the computing device.

Example 22: The method of example 21, wherein the identifying the controllable device in the image data includes processing the image data to identify a blinking light.

Example 23: The method of example 22, further comprising: determining properties of the blinking light; and matching the properties of the blinking light to the identification action performed by the controllable device.

Example 24: The method of example 23, wherein determining properties of the blinking light includes determining at least one of a blink time or a blink interval.

Example 25: The method of example 21, wherein the identifying the controllable device in the image data includes processing the image data to identify a light of a specific color.

Example 26: The method of example 21, wherein the identifying the controllable device in the image data includes processing the image data to identify an identification image that is being displayed by the controllable device.

Example 27: The method of example 26, further comprising determining a relative location of the controllable device with respect to the computing device based at least in part on a size of the identification image in the image data.

Example 28: The method of example 21, wherein the determining configuration information for the controllable device includes associating the controllable device with a room based at least in part on the location estimate for the computing device.

Example 29: The method of example 21, wherein the determining configuration information for the controllable device includes: accessing a representation of the physical space; determining a room name based on the location estimate and the representation of the physical space; and generating a name for the controllable device based at least in part on the room name.

Example 30: The method of example 21, wherein the determining configuration information for the controllable device includes: recognizing an object in the physical space based on the image data; generating a name for the controllable device based at least in part on the recognized object.

Example 31: The method of example 21, further comprising: storing the configuration information for the controllable device; accessing the stored configuration information; and triggering the controllable device to perform an action using the stored configuration information.

Example 32: A non-transitory computer-readable storage medium comprising instructions stored thereon that, when executed by at least one processor, are configured to cause a computing system to at least: capture image data of a physical space that includes a first controllable device performing an identification action; identify the first controllable device in the image data based at least in part on the identification action; recognize an object in the physical space based on the image data; and generate a name for the first controllable device based at least in part on the recognized object.

Example 33: The non-transitory computer-readable storage medium of example 32, wherein the instructions are further configured to cause the computing system to: determine a relative location of the first controllable device with respect to the recognized object; and wherein the instructions configured to cause the computing system to generate the name for the first controllable device include instructions configured to cause the computing system to generate the name for the first controllable device based at least in part on both the recognized object and the relative location of the first controllable device with respect to the recognized object.

Example 34: The non-transitory computer-readable storage medium of example 32, wherein the instructions are further configured to cause the computing system to: determine a location estimate for a computing device; access a representation of the physical space; determine a room name based on the location estimate and the representation of the physical space; and associate the first controllable device with the room name.

Example 35: The non-transitory computer-readable storage medium of example 32, wherein the instructions are further configured to cause the computing system to: store the name for the first controllable device based at least in part on the recognized object; receive a user input that includes the name and a controllable device command; and based on the user input including the name, direct the first controllable device command to first controllable device.

Example 36: The non-transitory computer-readable storage medium of example 32, wherein the instructions are further configured to cause the computing system to: identify a second controllable device in the image data based at least in part on the second controllable device performing a second identification action; determine a distance between the first controllable device and the second controllable device; and responsive to determining that distance between the first controllable device and a second controllable device is less than a predetermined threshold distance: generate controllable device group data that identifies the first controllable device and the second controllable device; and store the controllable device group data.

Example 37: The non-transitory computer-readable storage medium of example 36, wherein the instructions are further configured to cause the computing system to: retrieve the controllable device group data; receive a user input directed to the controllable device group; and trigger the first controllable device and the second controllable device to perform an action based on the user input.

Example 38: The non-transitory computer-readable storage medium of example 36, wherein the instructions are further configured to cause the computing system to: determine a room name based on the recognized object in the physical space; and associate the first controllable device with the room name.

Example 39: A computing device comprising: at least one processor; and memory storing instructions that, when executed by the at least one processor, cause the computing device to: determine a location estimate for a computing device; capture image data, by the computing device, of a physical space that includes a controllable device performing an identification action; identify the controllable device in the image data based at least in part on the identification action; and determine configuration information for the controllable device, the configuration information being based at least in part on the location estimate for the computing device.

Example 40: The computing device of example 39, further comprising a display device and wherein the instructions, when executed by the at least one processor, further cause the computing device to: determine image coordinates associated with the controllable device in the image data; trigger display of the image data on the display device; and trigger display of an overlay image on the image data based on the determined image coordinates.

Example 41: The computing device of example 39, wherein the instructions, when executed by the at least one processor, further cause the computing device to: access a representation of the physical space; determine a room name based on the location estimate and the representation of the physical space; and associate the controllable device with the room name.

What is claimed is:

1. A method, comprising:
   determining an estimate for a location of a computing device in a physical space, including:
   determining a first estimate based on a round-trip time to communicate with a wireless communication device;

identifying a first portion in a representation of the physical space corresponding to the first estimate; and
determining a second estimate according to a comparison of features extracted from image data of the physical space captured by the computing device with features in the first portion of the representation of the physical space;
identifying a first controllable device associated with the physical space according to the first portion of the representation of the physical space;
determining a relative location of the first controllable device with respect to the computing device based on an aiming direction of the computing device relative to the first controllable device; and
generating a user interface for interacting with the first controllable device based on the relative location that includes a first identifier representing the first controllable device on the user interface at a position corresponding to the relative location.

2. The method of claim 1, wherein generating the user interface includes selecting the first identifier representing the first controllable device, including:
determining a controllable device type of the first controllable device; and
selecting the first identifier based on the controllable device type.

3. The method of claim 1, further comprising:
receiving a user input;
determining a controllable device type of the first controllable device;
determining a command for the first controllable device based on the user input and the controllable device type; and
transmitting the command to the first controllable device.

4. The method of claim 3, wherein receiving the user input includes receiving a user input including at least one of a gesture input or a physical movement of the computing device.

5. The method of claim 1, further comprising triggering display of the user interface including triggering display of the user interface while a lock screen is being displayed by the computing device.

6. The method of claim 1, wherein the computing device is a handheld computing device, and the method further comprises triggering display of the user interface on a display device surface of the handheld computing device.

7. The method of claim 1, wherein the computing device is a head mounted computing device, and the method further comprises triggering display of the user interface as augmented reality content for viewing by a user of the head mounted computing device.

8. The method of claim 1, further comprising detecting the aiming direction of the computing device including detecting the aiming direction of the computing device at the first controllable device without emitting a signal to the first controllable device.

9. The method of claim 1, wherein the determining of the relative location of the first controllable device is based on a six degree-of-freedom (6DOF) pose of the computing device.

10. The method of claim 1, wherein the determining the estimate for the location of the computing device further includes:
inputting the round-trip time and the image to a machine learning model configured to output the estimate for the location of the computing device.

11. The method of claim 1, wherein the generating the user interface further includes:
positioning a second identifier on the user interface to indicate a relative location of a second controllable device in the physical space, at least one of the first controllable device or the second controllable device being outside a field of view of an image sensor of the computing device in the physical space.

12. The method of claim 11, further comprising:
identifying the second controllable device based on the estimate for the location of the computing device; and
determining the relative location of the second controllable device with respect to the computing device;
wherein generating the user interface further includes:
selecting the second identifier representing the second controllable device,
determining a second position on the user interface for displaying the second identifier based on the relative location of the second controllable device, and
positioning the second identifier representing the second controllable device at the second position on the user interface.

13. The method of claim 11, wherein identifying the first controllable device comprises:
identifying a plurality of controllable devices including the first controllable device and the second controllable device associated with the physical space in which the computing device is located; and
identifying a targeted controllable device, of the plurality of controllable devices, based on the aiming direction of the computing device.

14. The method of claim 13, wherein the user interface includes a plurality of controllable device identifiers including the first identifier and the second identifier identifying respective locations of the plurality of controllable devices including the first controllable device and the second controllable device relative to the computing device.

15. The method of claim 11, wherein positioning the first identifier includes positioning the first identifier on an arcuate indicator of the user interface, together with second identifier on the arcuate indicator to indicate the relative location of the second controllable device in the physical space.

16. The method of claim 1, wherein the determining the estimate for the location of the computing device includes:
comparing at least one image of the physical space to the representation of the physical space to determine a location of the computing device in the representation of the physical space.

17. The method of claim 16, the method further comprises: determining an offset of the first controllable device, including determining the offset based on the at least one image and the location of the first controllable device in the representation of the physical space.

18. A method, comprising:
determining an estimate for a location of a computing device in a physical space, including:
determining a first estimate based on a round-trip time to communicate with a wireless communication device;
identifying a first portion in a representation of the physical space corresponding to the first estimate; and
determining a second estimate according to a comparison of features extracted from image data of the physical space captured by the computing device with features in the first portion of the representation of the physical space;

identifying a first controllable device and a second controllable device associated with the physical space that are controllable by the computing device according to the first portion of the representation of the physical space, at least one of the first controllable device or the second controllable device being outside a field of view of an image sensor of the computing device;

determining relative locations of the first controllable device and the second controllable device with respect to the computing device based on an aiming direction of the computing device relative to the first controllable device and the second controllable device; and generating a user interface for display by the computing device that includes a spatial representation of the first controllable device and the second controllable device based on the relative locations of the first controllable device and the second controllable device, including:

positioning a first identifier and a second identifier respectively representing the first controllable device and the second controllable device on the user interface at positions on the user interface corresponding to the relative locations.

19. The method of claim 18, further comprising:
determining an orientation of the computing device; and
identifying a targeted controllable device from a plurality of controllable devices including the first controllable device and the second controllable device based on the orientation of the computing device,
wherein generating the user interface includes generating the user interface including an indicator of the targeted controllable device for display by the computing device.

20. The method of claim 19, further comprising determining a controllable device type of the targeted controllable device, and wherein generating the user interface includes generating the user interface including control elements selected based on the controllable device type for display by the computing device.

21. The method of claim 19, further comprising determining a setting value of the targeted controllable device, and wherein generating the user interface includes generating the user interface including an indicator of the setting value and a control element configured to trigger transmission of a command to modify the setting value in response to a user input.

22. The method of claim 19, further comprising:
determining an updated orientation of the computing device in response to detecting a physical movement of the computing device;
identifying an updated targeted controllable device from the plurality of controllable devices including the first controllable device and the second controllable device based on the updated orientation of the computing device; and
generating an updated user interface that includes an indicator of the updated targeted controllable device for display by the computing device.

23. The method of claim 18, wherein positioning the first identifier and the second identifier includes positioning a plurality of identifiers including the first identifier and the second identifier respectively representing a plurality of controllable devices including the first controllable device and the second controllable device on an arcuate indicator of the user interface, at positions on the arcuate indicator corresponding to the respective relative locations.

24. A method, comprising:
determining an estimate for a location of a computing device in a physical space, including:
  determining a first estimate based on a round-trip time to communicate with a wireless communication device;
  identifying a first portion in a representation of the physical space corresponding to the first estimate; and
  determining a second estimate according to a comparison of features extracted from image data of the physical space captured by the computing device with features in the first portion of the representation of the physical space;
determining an aiming direction of the computing device in the physical space;
identifying a first controllable device of a plurality of controllable devices within the physical space based on the aiming direction and the representation of the physical space;
determining an offset of the first controllable device including comparing the aiming direction in the representation of the physical space to a location of the first controllable device in the representation of the physical space; and
generating a user interface for control of the first controllable device, including:
  positioning a first identifier representing the first controllable device on the user interface at a position on the user interface corresponding to the offset.

25. The method of claim 24, further comprising updating the user interface in response to detected changes in the aiming direction of the computing device.

26. The method of claim 24, wherein the identifying of the first controllable device within the physical space based on the aiming direction includes:
capturing an image of the physical space along the aiming direction;
processing the image; and
identifying the first controllable device based on the processing of the image.

27. The method of claim 26, wherein the determining of the offset of the first controllable device with respect to the aiming direction of the computing device includes determining an angular offset, including:
determining a position of the first controllable device within the image captured along the aiming direction of the computing device; and
determining the angular offset based on the position of the first controllable device within the image.

28. The method of claim 24, wherein positioning the first identifier includes positioning the first identifier representing the first controllable device on an arcuate indicator of the user interface, at a position on the arcuate indicator corresponding to the offset, the offset being an angular offset.

* * * * *